United States Patent
Paz et al.

(10) Patent No.: US 12,395,948 B2
(45) Date of Patent: Aug. 19, 2025

(54) SYNCHRONIZATION SIGNAL BLOCK COVERAGE EXTENSION FOR A SUB-TERAHERTZ BAND

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 810 days.

(21) Appl. No.: 17/580,229

(22) Filed: Jan. 20, 2022

(65) Prior Publication Data

US 2023/0239815 A1 Jul. 27, 2023

(51) Int. Cl.
*H04W 24/08* (2009.01)
*H04W 56/00* (2009.01)

(52) U.S. Cl.
CPC ......... *H04W 56/001* (2013.01); *H04W 24/08* (2013.01)

(58) Field of Classification Search
CPC ............... H04W 56/001; H04W 24/08; H04L 27/26132; H04L 27/2692; H04L 27/2613; H04L 5/0053; H04L 5/006
See application file for complete search history.

(56) References Cited

U.S. PATENT DOCUMENTS

| | | | |
|---|---|---|---|
| 11,012,225 B1 | 5/2021 | Lu et al. | |
| 2013/0121188 A1* | 5/2013 | Das | H04L 27/2675 370/252 |
| 2019/0215058 A1* | 7/2019 | Smyth | H04B 7/18502 |
| 2021/0068101 A1* | 3/2021 | Chen | H04L 1/0072 |

(Continued)

FOREIGN PATENT DOCUMENTS

WO WO-2020142999 A1 * 7/2020

OTHER PUBLICATIONS

Huawei., et al., "Sidelink Synchronization Mechanisms for NR V2X", 3GPP TSG RAN WG1 Meeting #96bis, R1-1903946, 3rd Generation Partnership Project, Mobile Competence Centre, 650, Route Des Lucioles, F-06921 Sophia-Antipolis Cedex, France, RAN WG1, No. Xi'an, China, Apr. 8, 2019-Apr. 12, 2019, Apr. 2, 2019, 9 Pages, XP051707061, Table 2 figures 1, 2 Section 2.

(Continued)

*Primary Examiner* — Meng Vang
*Assistant Examiner* — Hector Reyes
(74) *Attorney, Agent, or Firm* — Holland & Hart LLP

(57) ABSTRACT

Methods, systems, and devices for wireless communications are described. A user equipment (UE) may support synchronization signal block (SSB) coverage extension for a sub-terahertz (sub-THz) band. The UE may monitor for multiple primary synchronization signals (PSSs) in a first instance of an SSB, a number of PSSs determined by the base station based on a periodicity of the SSB. The UE may combine the PSSs and determine a frequency offset for the SSB. The UE may monitor for additional instances of the SSB in accordance with the frequency offset. In some examples, the UE may monitor for one or more secondary synchronization signals (SSSs) in the first and additional instances of the SSB and combine the SSSs. In addition, the UE may monitor for a physical broadcast channel (PBCH) in the first and additional instances of the SSB, and decode the PBCH using log-likelihood ratio (LLR) combining.

30 Claims, 18 Drawing Sheets

(56) References Cited

U.S. PATENT DOCUMENTS

| | | | |
|---|---|---|---|
| 2021/0337494 A1* | 10/2021 | Ye | H04L 5/0096 |
| 2022/0150849 A1* | 5/2022 | Zhao | H04L 27/2626 |
| 2023/0275690 A1* | 8/2023 | Zhao | H04L 1/0045 |
| 2024/0348369 A1* | 10/2024 | Matsumura | H04W 74/0833 |

OTHER PUBLICATIONS

International Search Report and Written Opinion—PCT/US2023/060557—ISA/EPO—Apr. 11, 2023.
LG Electronics: "Discussion on NR Sidelink Synchronization Mechanism", 3GPP TSG RAN WG1 #96bis Meeting, R1-1905441 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019 Apr. 3, 2019 (Apr. 3, 2019), 21 Pages, XP051707511, Section 2, figure 1.

* cited by examiner

SYNCHRONIZATION SIGNAL BLOCK COVERAGE EXTENSION FOR A SUB-TERAHERTZ BAND

FIELD OF TECHNOLOGY

The following relates to wireless communications, including synchronization signal block (SSB) coverage extension for a sub-terahertz (sub-THz) band.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs may communicate with base stations using synchronization signal blocks (SSBs). Techniques for communicating SSBs in a sub-terahertz (sub-THz) band may be improved.

SUMMARY

The described techniques relate to improved methods, systems, devices, and apparatuses that support synchronization signal block (SSB) coverage extension for a sub-terahertz (sub-THz) band. Generally, the described techniques provide for combining (e.g., non-coherent combining, coherent combining) of primary synchronization signals (PSSs) in an SSB. In some cases, a base station may identify a periodicity of an SSB to be periodically broadcast to a user equipment (UE). The base station may include a number of PSSs in a first instance of the SSB, for example, based on the periodicity of the SSB. The UE may monitor for the PSSs in the first instance of the SSB, and upon receiving the first instance of the SSB, the UE may combine the PSSs. In some examples, based on combining the PSSs, the UE may determine a frequency offset for the SSB, where the frequency offset may be based on one or more frequency hypotheses.

Additionally, the UE may use similar combining and detection techniques for secondary synchronization signals (SSSs) and physical broadcast channels (PBCHs) transmitted in multiple SSB instances, while SSBs may include a single SSS or PBCH in a given SSB instance. That is, if a UE is to combine SSSs or PBCHs using a similar number of SSB instances as the number of PSSs used for combining, then the number of PSSs to be included in an SSB instance may be limited by the periodicity of the SSB instance with respect to a payload periodicity of a PBCH. In some examples, the UE may combine multiple SSSs across a first instance and additional instances of the SSB. Additionally, the UE may decode a PBCH across the first instance and additional instances of the SSB based on a log-likelihood ratio (LLR) combining.

A method for wireless communication at a UE is described. The method may include monitoring for a set of multiple PSSs in a first instance of an SSB, where a number of PSSs in the first instance of the SSB is based on a periodicity of the SSB, combining the set of multiple PSSs from the first instance of the SSB based on the monitoring, determining, based on the combining, a frequency offset for the SSB, and monitoring for additional instances of the SSB in accordance with the frequency offset.

An apparatus for wireless communication at a UE is described. The apparatus may include a processor, memory coupled with the processor, and instructions stored in the memory. The instructions may be executable by the processor to cause the apparatus to monitor for a set of multiple PSSs in a first instance of an SSB, where a number of PSSs in the first instance of the SSB is based on a periodicity of the SSB, combine the set of multiple PSSs from the first instance of the SSB based on the monitoring, determine, based on the combining, a frequency offset for the SSB, and monitor for additional instances of the SSB in accordance with the frequency offset.

Another apparatus for wireless communication at a UE is described. The apparatus may include means for monitoring for a set of multiple PSSs in a first instance of an SSB, where a number of PSSs in the first instance of the SSB is based on a periodicity of the SSB, means for combining the set of multiple PSSs from the first instance of the SSB based on the monitoring, means for determining, based on the combining, a frequency offset for the SSB, and means for monitoring for additional instances of the SSB in accordance with the frequency offset.

A non-transitory computer-readable medium storing code for wireless communication at a UE is described. The code may include instructions executable by a processor to monitor for a set of multiple PSSs in a first instance of the SSB, where a number of PSSs in the first instance of the is based on a periodicity of the SSB, combine the set of multiple PSSs from the first instance of the based on the monitoring, determine, based on the combining, a frequency offset for the SSB, and monitor for additional instances of the in accordance with the frequency offset.

Some examples of the method, apparatuses, and non-transitory computer-readable medium described herein may further include operations, features, means, or instructions for monitoring for a first SSS in the first instance of the SSB, monitoring for one or more additional SSSs in the additional instances of the SSB, and combining the first SSS and the one or more additional SSSs, where a number of SSSs combined may be equal to the number of the set of multiple PSSs in the first instance of the SSB.

Some examples of the method, apparatuses, and non-transitory computer-readable medium described herein may further include operations, features, means, or instructions for monitoring for a PBCH in the first instance of the SSB, monitoring for the PBCH in the additional instances of the SSB, and decoding the PBCH based on an LLR combining of the PBCH being monitored in each of the first instance of the SSB and in the additional instances of the SSB, where a number of instances of the SSB in which the PBCH may be monitored may be equal to the number of the set of multiple PSSs in the first instance of the SSB.

In some examples of the method, apparatuses, and non-transitory computer-readable medium described herein, determining the frequency offset for the SSB may include operations, features, means, or instructions for determining one or more frequency offset hypotheses based on the combining of the set of multiple PSSs from the first instance of the SSB and determining the frequency offset through a frequency offset refinement procedure based on a single instance of the one or more frequency offset hypotheses.

In some examples of the method, apparatuses, and non-transitory computer-readable medium described herein, monitoring for the set of multiple PSSs in the first instance of the SSB may include operations, features, means, or instructions for monitoring for two or more PSSs that may be in adjacent symbols of the first instance of the SSB.

In some examples of the method, apparatuses, and non-transitory computer-readable medium described herein, monitoring for the set of multiple PSSs in the first instance of the SSB may include operations, features, means, or instructions for monitoring for two or more PSSs that may be in non-adjacent symbols of the first instance of the SSB.

In some examples of the method, apparatuses, and non-transitory computer-readable medium described herein, the number of the set of multiple PSSs in the first instance of the SSB may be further based on a target signal-to-noise ratio (SNR) for acquisition of the SSB.

In some examples of the method, apparatuses, and non-transitory computer-readable medium described herein, monitoring for the set of multiple PSSs in the first instance of the SSB may include operations, features, means, or instructions for monitoring for two PSSs in the first instance of the SSB based on the periodicity of the SSB being half a PBCH payload periodicity.

In some examples of the method, apparatuses, and non-transitory computer-readable medium described herein, monitoring for the set of multiple PSSs in the first instance of the SSB may include operations, features, means, or instructions for monitoring for four PSSs in the first instance of the SSB based on the periodicity of the SSB being a quarter or less of a PBCH payload periodicity.

In some examples of the method, apparatuses, and non-transitory computer-readable medium described herein, monitoring for the set of multiple PSSs in the first instance of the SSB may include operations, features, means, or instructions for monitoring for eight PSSs in the first instance of the SSB based on the periodicity of the SSB being an eighth or less of a PBCH payload periodicity, where the first instance of the SSB occupies a portion of a single slot, the portion being more than a half-slot.

In some examples of the method, apparatuses, and non-transitory computer-readable medium described herein, the number of PSSs in the first instance of the SSB may be further based on the periodicity of the SSB with respect to a PBCH payload periodicity.

In some examples of the method, apparatuses, and non-transitory computer-readable medium described herein, the PBCH payload periodicity may be 80 ms.

In some examples of the method, apparatuses, and non-transitory computer-readable medium described herein, the PBCH payload periodicity may be greater than 80 ms.

Some examples of the method, apparatuses, and non-transitory computer-readable medium described herein may further include operations, features, means, or instructions for determining the periodicity of the SSB based on the number of the set of multiple PSSs in the first instance of the SSB.

In some examples of the method, apparatuses, and non-transitory computer-readable medium described herein, monitoring for the additional instances of the SSB may include operations, features, means, or instructions for monitoring for the additional instances of the SSB in accordance with the frequency offset and on a same beam as the monitoring for the set of multiple PSSs in the first instance of the SSB.

In some examples of the method, apparatuses, and non-transitory computer-readable medium described herein, monitoring for the set of multiple PSSs may include operations, features, means, or instructions for monitoring for the set of multiple PSSs in the first instance of the SSB in a sub-THz band.

Some examples of the method, apparatuses, and non-transitory computer-readable medium described herein may further include operations, features, means, or instructions for combining the set of multiple PSSs from the first instance of the SSB includes non-coherent combining.

Some examples of the method, apparatuses, and non-transitory computer-readable medium described herein may further include operations, features, means, or instructions for combining the set of multiple PSSs from the first instance of the SSB includes coherent combining.

A method for wireless communication at a base station is described. The method may include identifying a periodicity of an SSB to be periodically broadcast, determining a number of PSSs to include in a first instance of the SSB based on the periodicity of the SSB, and transmitting the first instance of the SSB with a set of multiple PSSs in accordance with the number of PSSs determined based on the periodicity of the SSB.

An apparatus for wireless communication at a base station is described. The apparatus may include a processor, memory coupled with the processor, and instructions stored in the memory. The instructions may be executable by the processor to cause the apparatus to identify a periodicity of an SSB to be periodically broadcast, determine a number of PSSs to include in a first instance of the SSB based on the periodicity of the SSB, and transmit the first instance of the SSB with a set of multiple PSSs in accordance with the number of PSSs determined based on the periodicity of the SSB.

Another apparatus for wireless communication at a base station is described. The apparatus may include means for identifying a periodicity of an SSB to be periodically broadcast, means for determining a number of PSSs to include in a first instance of the SSB based on the periodicity of the SSB, and means for transmitting the first instance of the SSB with a set of multiple PSSs in accordance with the number of PSSs determined based on the periodicity of the SSB.

A non-transitory computer-readable medium storing code for wireless communication at a base station is described. The code may include instructions executable by a processor to identify a periodicity of an SSB to be periodically broadcast, determine a number of PSSs to include in a first instance of the SSB based on the periodicity of the SSB, and transmit the first instance of the SSB with a set of multiple PSSs in accordance with the number of PSSs determined based on the periodicity of the SSB.

Some examples of the method, apparatuses, and non-transitory computer-readable medium described herein may further include operations, features, means, or instructions for transmitting a first SSS in the first instance of the SSB and transmitting one or more additional SSSs in additional instances of the SSB.

Some examples of the method, apparatuses, and non-transitory computer-readable medium described herein may further include operations, features, means, or instructions for transmitting a PBCH in the first instance of the SSB and transmitting the PBCH in additional instances of the SSB.

In some examples of the method, apparatuses, and non-transitory computer-readable medium described herein, transmitting the first instance of the SSB block with the set of multiple PSSs may include operations, features, means, or instructions for transmitting two or more PSSs that may be in adjacent symbols of the first instance of the SSB.

In some examples of the method, apparatuses, and non-transitory computer-readable medium described herein, transmitting the first instance of the SSB with the set of multiple PSSs may include operations, features, means, or instructions for transmitting two or more PSSs that may be in non-adjacent symbols of the first instance of the SSB.

In some examples of the method, apparatuses, and non-transitory computer-readable medium described herein, the number of the set of multiple PSSs in the first instance of the SSB may be further based on a target SNR for acquisition of the SSB.

In some examples of the method, apparatuses, and non-transitory computer-readable medium described herein, transmitting the first instance of the SSB with the set of multiple PSSs may include operations, features, means, or instructions for transmitting two PSSs in the first instance of the SSB based on the periodicity of the SSB being half a PBCH payload periodicity.

In some examples of the method, apparatuses, and non-transitory computer-readable medium described herein, transmitting the first instance of the SSB with the set of multiple PSSs may include operations, features, means, or instructions for transmitting four PSSs in the first instance of the SSB based on the periodicity of the SSB being a quarter or less of a PBCH payload periodicity.

In some examples of the method, apparatuses, and non-transitory computer-readable medium described herein, transmitting the first instance of the SSB with the set of multiple PSSs may include operations, features, means, or instructions for transmitting eight PSSs in the first instance of the SSB based on the periodicity of the SSB being an eighth or less of a PBCH payload periodicity, where the first instance of the SSB occupies a portion of a single slot, the portion being more than a half-slot.

In some examples of the method, apparatuses, and non-transitory computer-readable medium described herein, the number of PSSs in the first instance of the SSB may be further based on the periodicity of the SSB with respect to a PBCH payload periodicity.

In some examples of the method, apparatuses, and non-transitory computer-readable medium described herein, the PBCH payload periodicity may be 80 ms.

In some examples of the method, apparatuses, and non-transitory computer-readable medium described herein, the PBCH payload periodicity may be greater than 80 ms.

DETAILED DESCRIPTION

Figure 1:
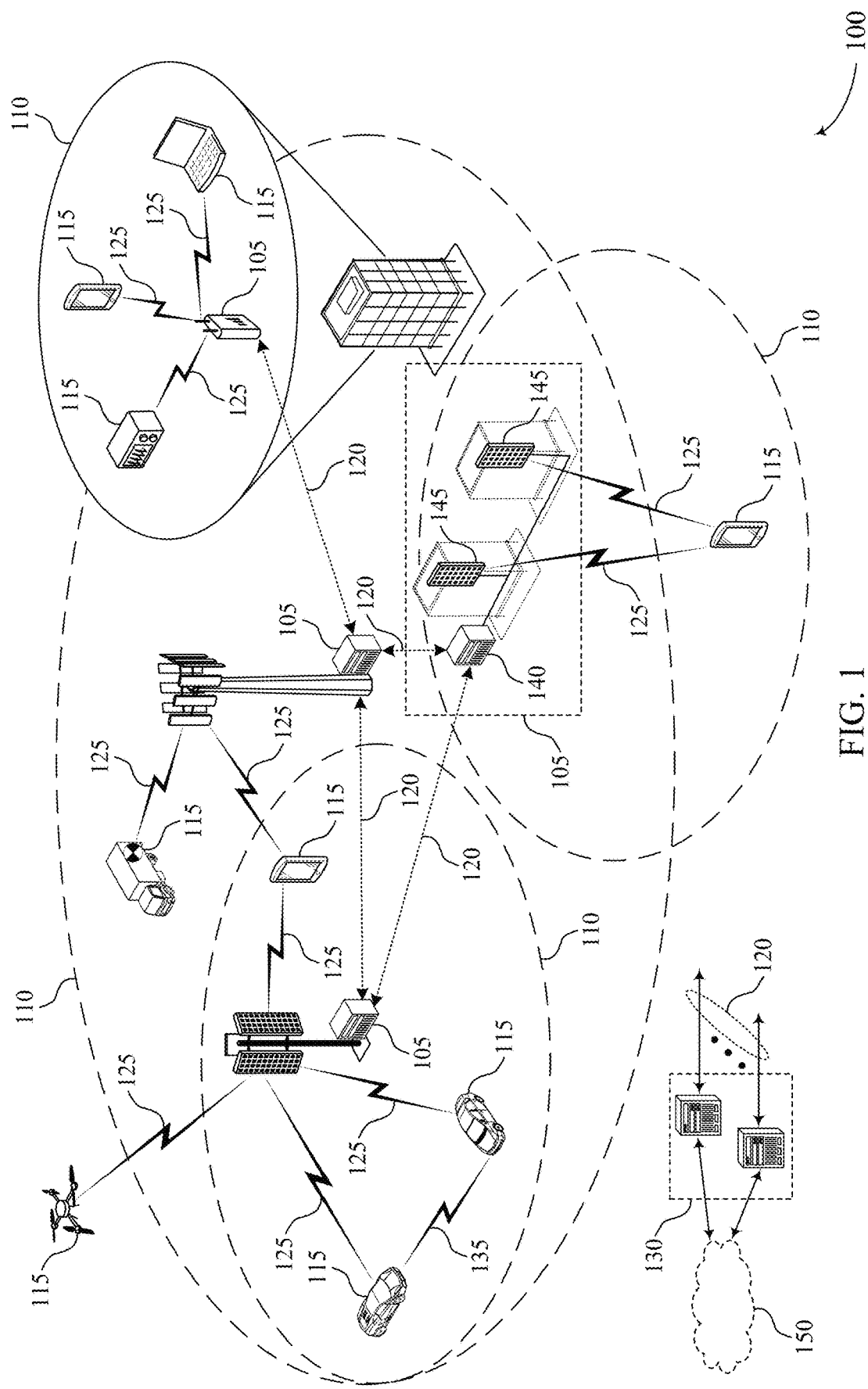
FIG. 1 illustrates an example of a wireless communications system that supports synchronization signal block (SSB) coverage extension for a sub-terahertz (sub-THz) band in accordance with aspects of the present disclosure.

In some wireless communications systems, a base station may transmit one or more synchronization signal blocks (SSBs) to a user equipment (UE), where an SSB may include multiple synchronization signals (e.g., primary synchronization signals (e.g., PSSs), secondary synchronization signals (e.g., SSSs), and other synchronization signals). In some cases, the UE may use combining (e.g., non-coherent combining, coherent combining) to detect a PSS. For example, the UE may monitor for multiple instances of the same SSB and use combining to detect a PSS. To perform this combining, a time drift between two consecutive instances of the same SSB is expected to not exceed more than a single sample time (e.g., a minimum applicable sampling rate for receiving the instances of the SSBs). As such, a limit on the time drift may consequently limit a periodicity of the SSB transmissions, particularly in sub-terahertz (sub-THz) systems. For example, in sub-THz systems, the time drift may exceed an allowed threshold, thus preventing the UE from combining the PSSs from two or more SSBs.

To decrease the time drift and enable combining of more than two SSBs, the UE may use a larger number of time drift offset hypotheses such as frequency offset hypotheses (e.g., used to determine a frequency offset), lower SSB periodicities, a decreased sampling rate, or any combination thereof. However, these methods may increase system complexity, SSB-related overhead, and power consumption at the UE and a base station in a sub-THz system.

Techniques described herein enable combining (e.g., non-coherent combining, coherent combining) of PSSs within a single SSB (or SSB instance) for SSB coverage extension in a sub-THz band. For example, a UE may increase a number of PSSs per SSB such that the UE may combine the PSSs within the same SSB, mitigating issues cause by a time drift between SSBs. In some cases, a base station may identify a periodicity of an SSB to be periodically broadcast to the UE. The base station may include a number of PSSs in a first instance of the SSB, for example, based on the periodicity of the SSB. The UE may monitor for the PSSs in the first instance of the SSB, and upon receiving the first instance of the SSB, the UE may combine the PSSs. In some examples, based on combining the PSSs, the UE may determine a frequency offset for the SSB, where the frequency offset may be based on one or more frequency hypotheses.

Additionally, the UE may use similar combining and detection techniques for SSSs and physical broadcast channels (PBCHs) transmitted in multiple SSB instances. An SSB may generally only include a single SSS or PBCH in a given SSB instance. Therefore, if a UE is to combine SSSs or PBCHs using a similar number of SSB instances as the number of PSSs combined from a single SSB instance, then the number of PSSs to be included in an SSB may be limited by the periodicity of the SSB instance with respect to a payload periodicity of a PBCH. In some examples, the UE may combine multiple SSSs across a first instance and additional instances of the SSB. Additionally, the UE may decode a PBCH across the first instance and additional instances of the SSB based on a log-likelihood ratio (LLR) combining.

By adding additional PSS symbols (e.g., PSS repetitions) per SSB, the UE may realize an extended SSB detection range (e.g., cell coverage range) for sub-THZ systems, with lower SSB periodicity options, which may reduce SSB-related overhead and reduce transmit power consumption, and reduced complexity for initial cell acquisition (e.g., InitAcq), which may reduce power consumption and overheating for the UE. Further, adding additional PSS symbols per SSB may enable faster automatic gain control (AGC) calibration during initial cell acquisition for low SNRs (e.g., after the UE receives a first SSB, successfully detects one or more PSSs, and combines the one or more PSSs). In some examples, the described techniques may enable the UE to allocate more guard resource elements (REs) around PSS sequences for noise estimation to enhance SSS and PBCH processing. In addition, PSS repetitions may enable an extended time gap for fine frequency offset estimation (e.g., which the UE may perform based on PSS symbols and SSS symbols) in a connected mode, which may reduce frequency offset estimation variance, improve frequency offset estimation accuracy, improve synchronization loops tracking characteristics, and reduce wake up limitations during a sleep time for SSB processing in favor of a synchronization loops update at the UE (e.g., which may improve UE power consumption and battery performance). In some examples, the UE may use the additional PSS symbols for more efficient UE beam refinement and beam tracking while in a connected mode, such that the UE may test multiple receive beams per SSB using several PSS repetitions. Additionally or alternatively, adding the PSS repetitions may increase reliability of SSB-based measurements for low signal-to-noise ratio (SNR) with a relatively lower SSB measurement averaging period.

Aspects of the disclosure are initially described in the context of wireless communications systems. Aspects of the disclosure are then described in the context of SSB formats and process flows. Aspects of the disclosure are further illustrated by and described with reference to apparatus diagrams, system diagrams, and flowcharts that relate to SSB coverage extension for a sub-THz band.

FIG. 1 illustrates an example of a wireless communications system 100 that supports SSB coverage extension for a sub-THz band in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna array's (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

In some wireless communications systems 100, a UE 115 and a base station 105 may transmit communications using SSBs, where an SSB may include multiple synchronization signals (e.g., PSSs, SSSs, PBCH). In some examples, the number of SSBs transmitted on different half slots may be confined to a predefined time window duration (e.g., a 5 millisecond (ms) window), which may include an SSB burst. The base station 105 may associate and transmit each SSB of the SSB burst (e.g., each SSB instance) with a different transmit beam to sweep (e.g., cover) an entire cell range, such that the base station 105 may perform beam sweeping over the SSB. In some cases, the base station 105 may transmit SSB bursts periodically (e.g., with a periodicity of 5 ms, 10 ms, 20 ms, 40 ms, 80 ms, 160 ms). In addition, the base station 105 may transmit an SSB using an OFDM waveform and multiple numerologies depending on the cell frequency. Based on the numerology used by the base station 105, a different number of SSBs (e.g., or transmit beams) may be included in a single SSB burst.

UEs 115 within a cell coverage range of a base station 105 may use SSBs. For example, a UE 115 may use an SSB to discover a cell and camp on the cell, connect to the cell, or both (e.g., an initial access procedure, an InitAcq procedure). In some cases, the UE 115 may use an SSB to maintain a continuous time and frequency synchronization with a base station 105, which may serve beam and AGC tracking (e.g., in a connected mode). Additionally or alternatively, the UE 115 may use an SSB to maintain a serving cell measurements and neighboring cell measurements to support mobility and handover procedures between cells.

In some examples, a UE 115 may initially detect an SSB through PSS sequence detection, in which the UE 115 may use a time domain correlation of the received signal with multiple PSS signal hypotheses covering a multi-dimensional search space including time, sequence (e.g., corresponding to a cell identifier of the cell the UE 115 is using), frequency offset, beam, SSB frequency raster, numerology hypotheses, or any combination thereof. That is, the UE 115 may detect a PSS sequence which may span multiple domains (e.g., time domain, frequency domain, sequence domain) and correlate the PSS sequence to the multiple domains to connect with a corresponding base station 105.

If a UE 115 resides in a region with poor reception conditions (e.g., a cell edge, an area with a low SNR), the UE 115 may use combining (e.g., non-coherent combining) of correlator outputs corresponding to several occurrences of the same SSB to successfully acquire and detect the SSB (e.g., the UE 115 may use energy aggregation from multiple correlation results to pass a detection threshold and to extend the detection range up to –10 decibel (dB) SNR or below). The UE 115 may use the combining for PSS detection, SSS detection, LLR combining, PBCH decoding (e.g., where PBCH demodulation may be improved via additional averaging and processing gain increases for channel parameters estimation over several SSBs), or any combination thereof. Without the combining, the UE 115 may fail to extend the reliable detection range (e.g., up to an SNR of –10 dB) without increasing complexity and reducing practicality of the implementation.

In some examples of combining (e.g., non-coherent combining), where the UE 115 may combine multiple correlation outputs corresponding to different time occurrences of the same SSB, the combining may result in a detection metric (e.g., a peak power growth) for the correct (e.g., or closest) time hypothesis. Such combining may require that a non-corrected or residual time drift between at least two consecutive occurrences of the same SSB fail to exceed more than a single sample time. Otherwise, combined correlation peaks may fail to build up and their summation power may fail to exceed the detection threshold. That is, when a UE 115 detects a PSS, the UE 115 may use a time hypothesis to detect the SSB. For example, when the UE 115 initially detects two SSBs, a built up, residual timing offset may occur which causes a time drift in the time domain. Because of the time drift, the time hypothesis for the two SSBs may differ, resulting in failed combining.

In some examples, a sample time may be defined by a minimum applicable sampling rate for the correlation operation, and the UE 115 or the base station 105 may predetermine the sample time using a subcarrier spacing a number of REs occupied by the SSB, an applicable oversampling factor of a narrow band chain used for the SSB search, or any combination thereof. In some cases, a higher oversampling factor (e.g., sampling rate) may partially improve detection performance, but may reduce the sample time duration. The sample time may set a limitation for a residual time drift between consecutive occurrences of the same SSB used for combining. In some examples, the UE 115 may determine the time drift (e.g., or the residual time drift after a proactive time correction corresponding to a tested frequency offset or parts-per million (ppm) error hypothesis) by multiplication between a maximum residual ppm error (e.g., which the UE 115 may determine using a maximum residual frequency offset) and time gap between consecutive occurrences of the same SSB (e.g., determined by a periodicity of the SSB). That is, the longer the time gap between the consecutive SSBs, the longer the time drift. The UE 115 may limit the time drift to a single sample time duration to limit the maximum applicable SSB period duration (e.g., the UE 115 may use a higher SSB periodicity to limit the maximum applicable SSB period duration in a sub-THz system compared to other bands).

For sub-THZ systems, which may be employed with a significantly higher SCS and a significantly lower sample time, usage of a combining as a part of the SSB detection procedure (e.g., used because of an expected limited coverage for a sub-THz system, which is the result from a higher path loss with a higher carrier frequency and also lower power amplifier efficiency at sub-THz frequencies) may fail without a significantly higher number of tested frequency offset hypotheses used to decrease the maximum residual ppm error. Alternatively, the UE 115 may use a much lower SSB period time for sub-THZ bands compared to other bands. As such, to perform combining, the UE 115 may use a higher number of frequency offset hypotheses, which may increase detector complexity and power consumption for the receiver (e.g., a parameter of sub-THz systems). Additionally or alternatively, to perform the combining the UE 115 may decrease SSB periods (e.g., below 5 ms), which may increase SSB overhead and corresponding power consumption for transmission, and may reduce accommodations for an increased number of beams (e.g., to be covered by an SSB burst) that the base station 105 may use for sub-THz systems (e.g., the number of SSB beams for a sub-THz system may reach approximately 1000 beams or more in some cases). As such, performing the combining may increase power consumption at the UE 115.

In an example, the UE 115 may calculate a maximum residual frequency offset (e.g., which may be translated to a maximum residual ppm) based on a number of frequency offset hypotheses. In addition, the UE 115 may calculate a maximum time drift per SSB period based on the number of frequency offset hypotheses (e.g., in InitAcq) and an SSB periodicity. For example, for a given set of system parameter values and for 12 frequency offset hypotheses, the UE 115 may calculate the maximum time drift within one sample time range and with the lowest possible SSB periodicity of 5 ms (e.g., assuming non-coherent combining of two SSBs). However, implementing a combining procedure with a large number of frequency offset hypotheses may increase complexity and increase power consumption at the UE 115. In addition, combining more than two SSBs may multiple the maximum time drift accordingly (e.g., based on the number of combined SSBs), which may further increase the complexity of the combining procedure.

The UE 115 may mitigate a time drift to enable combining (e.g., non-coherent combining) of several SSBs. For example, the UE 115 may mitigate the time drift by increasing a number of frequency offset hypotheses until the time drift satisfies the detection threshold, which may increase complexity of the system. For example, to support combining with an SSB periodicity larger than 5 ms, the UE 115 may use more than twelve frequency offset hypotheses (e.g., even when combining two SSBs). Increasing the number of frequency offsets may additionally increase the likelihood of confusing neighboring frequency offset hypotheses as the hypotheses may be close in terms of detection peak power.

In some examples, the UE 115 may increase the number of frequency offset hypotheses using a telescopic frequency offset hypothesis search which may use a limited number of coarse frequency offset hypotheses for a single SSB occurrence, an additional number of fine frequency offset hypotheses before combining multiple SSBs around the most probably detection candidates (e.g., and a corresponding coarse frequency offset hypothesis) based on a single SSB, or both. Using the telescopic frequency offset hypothesis may reduce complexity but incur a performance penalty at a lowest SNR edge where a single SSB may fail to reliably identify the most probable detection candidates, in which case the UE 115 may fail to detect them at all. In some examples, the UE 115 may use the telescopic frequency offset hypothesis to increase the density of frequency offset hypotheses by two. However, sub-THz systems may use a greater increase in the density of frequency offset hypotheses (e.g., by at least a factor of four).

In some cases, the UE 115 or the base station 105 may add a time drift uncertainty or a time drift offset between combined consecutive SSBs to provide an additional search dimension or hypothesis. In some examples, the UE 115 or the base station 105 may add a proactive time drift correction between the combined SSBs per tested frequency offset hypothesis, where each frequency offset hypothesis may correspond to an error (e.g., ppm_err), which may be translated to an expected time draft during an SSB period time. To reduce a maximum residual time drift or uncertainty between the combined SSBs (e.g., after the proactive time drift correction per frequency offset hypothesis), the UE 115 may use several deviations around the expected time drift per frequency hypothesis (e.g., additional search dimensions), and one deviation may be beneficial for detection energy accumulation based on a combining. For example, given a maximal time drift uncertainty of four samples, between two combined SSBs, the UE 115 may test seven additional combining hypotheses (e.g., tabulating any extra time offset options from the range [−4:4]). The UE 115 may add this extra search dimension in addition to an existing multi-dimensional search space, which may increase complexity and power consumption.

In some examples, to enable combining (e.g., non-coherent combining) of several SSBs, the UE 115 may decrease the sampling rate of a correlator output before the combining by some factor M. Decreasing the sampling rate may increase robustness of a residual time drift during combining, however may introduce a detection performance penalty by decreasing correlation peak power. For example, down sampling with a factor of M=2 may have a limited performance penalty, however, for sub-THz scenarios, the down sampling factor may be at least M=4 to support an SSB period of 10 ms and the combining of 2 SSBs, which may introduce a higher performance penalty. In addition, increasing a number of frequency offset hypotheses, introducing a time drift offset, decreasing the sampling rate of a correlator output, or any combination thereof may fail to mitigate a time drift and enable combining of several SSBs in a sub-THz scenario targeting a low SNR and a typical range of SSB periodicities.

To use lower SSB periodicities (e.g., on the same order of what may be used for other bands to have a limited SSB overhead and reduced power consumption at a base station), the wireless communications system 100 may support SSB coverage extension (e.g., by enabling combining) while reducing excessing SSB-related overhead and power consumption at the UE 115 (e.g., lower InitAcq complexity) and at the base station 105 (e.g., lower period of SSB transmissions) in a sub-THz system. For example, the UE 115 may increase a number of PSSs per SSB such that the UE 115 may combine the PSSs within the same SSB, mitigating issues cause by a time drift between SSBs. In some cases, the base station 105 may identify a periodicity of an SSB to be periodically broadcast to the UE 115. The base station 105 may include a number of PSSs in a first instance of the SSB, for example, based on the periodicity of the SSB. The UE 115 may monitor for the PSSs in the first instance of the SSB, and upon receiving the first instance of the SSB, the UE 115 may combine the PSSs. In some examples, based on combining the PSSs, the UE 115 may determine a frequency offset for the SSB, where the frequency offset may be based on one or more frequency hypotheses.

Additionally, the UE 115 may use similar combining and detection techniques for SSSs and PBCHs transmitted in a plurality of SSB instances, where a single SSB instance may include a single SSS or PBCH. If a UE 115 is to combine SSSs or PBCHs using a similar number of SSB instances as the number of PSS instances combined from a single SSB instance, then the number of PSSs included in an SSB may be limited by the periodicity of the SSB instance with respect to a payload periodicity of a PBCH. In some examples, the UE 115 may combine multiple SSSs across a first instance and additional instances of the SSB. Additionally, the UE 115 may decode a PBCH across the first instance and additional instances of the SSB based on an LLR combining.

Figure 2:
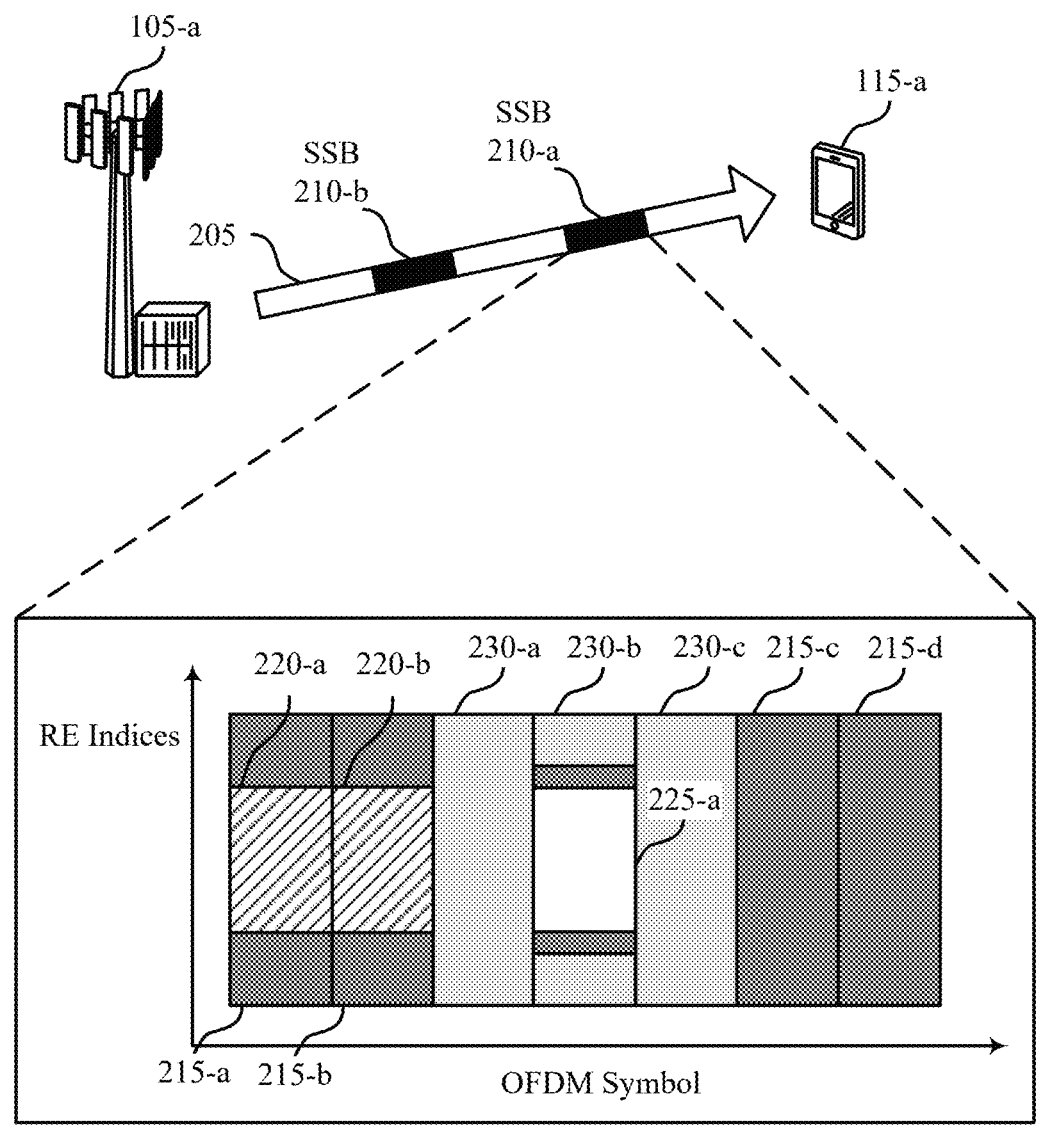
FIG. 2 illustrates an example of a wireless communications system that supports SSB coverage extension for a sub-THz band in accordance with aspects of the present disclosure.

FIG. 2 illustrates an example of a wireless communications system 200 that supports SSB coverage extension for a sub-THz band in accordance with aspects of the present disclosure. In some examples, the wireless communications system 200 may implement aspects of the wireless communications system 100 or may be implemented by aspects of the wireless communications system 100. For example, the wireless communications system 200 may include a base station 105-a and a UE 115-a, which may be examples of corresponding devices described herein.

The wireless communications system 200 may support SSB coverage extension for a sub-THz band. For example, the techniques described herein may enable combining (e.g., non-coherent combining, coherent combining) of PSSs to increase SSB detection and SNR coverage. In some examples, the base station 105-a and the UE 115-a may operate in a sub-THz band, and the base station 105-a and the UE 115-a may communicate via a communications link 205 (e.g., a downlink). For example, the base station may transmit an SSB 210 (e.g., an SSB 210-a, which may be a first instance of the SSB 210, or an SSB 210-b, which may be an additional instance of the SBS 210) to the UE 115-a via the communications link 205.

In some examples, the UE 115-a may utilize SSB structure augmentation to enable the combining of PSSs 220 on a single SSB 210. For example, the UE 115-a may increase a number of PSSs 220 (e.g., PSS symbols) per SSB 210 such that the UE 115-a may combine the PSSs 220 within the same SSB 210. In some examples, the SSB 210-a (e.g., a first instance of the SSB 210) may include seven OFDM symbols and different RE components, which may include empty REs 215 (e.g., unused REs), the PSSs 220 (e.g., used for SSB detection, initial access procedures), SSSs 225, PBCH payloads 230, or any combination thereof. In the example of FIG. 2, the symbol format of the SSB 210-a may include a first symbol with an empty RE 215-a and a PSS 220-a, a second symbol with an empty RE 215-b and a PSS 220-b, a third symbol with a PBCH payload 230-a, a fourth symbol with a PBCH payload 230-b, an SSS 225-a, and empty REs 215, a fifth symbol with a PBCH payload 230-c, a sixth symbol with an empty RE 215-c, and a seventh symbol with an empty RE 215-d. It should be noted that the symbol format of the SSB 210-a is an example, and that different symbol formats (e.g., including different combinations of empty REs 215, PSSs 220, SSSs 225, PBCH payloads 230, or any other signal components) and different quantities of PSSs 220 (e.g., a higher number of PSS symbol repetitions per SSB 210) may be used.

In some cases, a time gap between consecutive PSSs 220 (e.g., PSS symbols) may be negligible (e.g., one or several OFDM symbols), for example, compared to a minimal SSB periodicity of 5 ms, which the UE 115-a may account for in the combining of the PSSs 220 in the SSB 210-a. Because of this negligible time gap, the UE 115-a may have a greater resilience to a residual error (e.g., a residual ppm error) as limitations for combining related to a time drift may be removed. In some cases, the UE 115-a may monitor for two or more PSSs 220 that are in adjacent (e.g., consecutive) symbols of the SSB 210-a, for example, the PSS 220-a and the PSS 220-b, which may be in the first and second symbols of the SSB 210-a. In some other cases, the UE 115-a may monitor for two or more PSSs 220 that are in non-adjacent (e.g., non-consecutive) symbols of the SSB 210-a (e.g., an SSS 225 may be between two PSSs 220). In some examples, each symbol may have a period on the order of 1 microsecond (μs), and as such, the time gap between the PSS 220-a and the PSS 220-b may be approximately 1 μs. That is, the time gap between each PSS 220 may be very small compared to the SSB periodicity of 5 ms (e.g., if the PSS 220-a is in the first symbol of the SSB 210-a and the PSS 220-b is in the seventh symbol of the SSB 210-a, providing a 6-symbol gap between the PSSs 220, the time gap may be on the order of 6 μs).

In some examples, the UE 115-a may monitor for multiple PSSs 220 (e.g., the PSS 220-a and the PSS 220-b) in the SSB 210-a. In some cases, a number of PSSs 220 in the SSB 210-a may be based on a periodicity of the SSB 210-a. Additionally or alternatively, the number of PSSs 220 may be based on a target SNR for the initial acquisition of the SSB 210-a (e.g., a targeted, lowest detection or InitAcq SNR). The UE 115-a may use an exhaustive, high-complexity search to detect the PSSs 220 as PSS detection may enable the UE 115-a to acquire the SSB 210-a. In some examples, the UE 115-a may combine the PSS 220-a and the PSS 220-b from the SSB 210-a, and based on the combining, the UE 115-a may determine a frequency offset for the SSB 210-a. That is, once the UE 115-a detects the PSS 220-a and the PSS 220-b (e.g., the number of detected PSSs increased by the combining detection range), the UE 115-a may perform frequency offset refinement around the PSSs 220 using a PSS detection frequency offset hypothesis. For example, based on combining the PSS 220-a and the PSS 220-b, the UE 115-a may determine one or more frequency offset hypotheses and refine the frequency offset using a frequency offset refinement procedure based on a single instance of the one or more frequency offset hypotheses. In some examples, the PSS-based frequency offset refinement procedure may enable the UE 115-a to achieve a residual ppm error that enables the UE 115-a to combine SSSs for a time span greater than 80 ms.

In some cases, the UE 115-a may perform the frequency offset refinement for a most optimal frequency offset hypothesis (e.g., which already passed a detection threshold), and as such, the UE 115-a may test some number of additional frequency offset hypotheses (e.g., perform a refined frequency offset hypothesis search) around a frequency offset hypothesis corresponding to a detected PSS peak without increasing complexity. The UE 115-a may achieve an optimal residual frequency offset (e.g., ppm_err) to achieve a limited residual time drift accumulation and enable the combining (e.g., non-coherent combining) of one or more consecutive occurrences of the same SSB 210 for SSB detection enhancement and coverage extension. Using the SSB structure augmentation as described herein, the SSB 210-a may lack an accumulated time uncertainty (e.g., an accumulated time drift) between the combined PSSs 220 or correlator outputs, and the UE 115-a may refrain from using an increased number of frequency offset hypotheses for an initial access procedure (e.g., three frequency offset hypotheses for detecting the PSSs 220 using combining). In some cases, the UE 115-a may monitor for additional instances of the SSB 210, such as the SSB 210-b, in accordance with the frequency offset.

In some examples, based on combining the PSSs 220 in the SSB 210-a, the UE 115-a may use a similar combining factor to decode the SSSs 225 and the PBCH payloads 230 to maintain a balanced detection and demodulation and decoding performance of the different components in the SSB 210-a. In some examples, the SSB 210-a may lack replications of SSSs 225 or PBCH payloads 230. That is, in the example of FIG. 2, the SSB 210-a may include the SSS 225-a (e.g., a single SSS 225) and multiple PBCH payloads 230, however in other examples, the SSB 210-a may include single or multiple SSSs 225, single or multiple PBCH payloads 230, or any combination thereof.

In some cases, once the UE 115-a detects the PSSs 220, the UE 115-a may further reduce a residual error by performing frequency offset refinement using a telescopic search around the selected frequency offset hypothesis. The resulting residual error may be small enough to enable the UE 115-a to perform combining between consecutive SSBs 210 (e.g., the SSB 210-a and the SSB 210-b) with a timing offset (e.g., drift uncertainty) that fails to exceed a single sample time. For example, the UE 115-a may monitor for a first SSS 225 (e.g., the SSS 225-a) in the SSB 210-a and one or more additional SSSs 225 in the SSB 210-b. In some cases, the UE 115-a may combine the SSS 225-a and the one or more additional SSSs 225, where a number of combined SSSs 225 may be equal to a number of the PSSs 220 in the SSB 210-a (e.g., two SSSs 225, two PSSs 220). Additionally, the UE 115-a may monitor for a PBCH payload 230 in the SSB 210-a and the SSB 210-b. Based on LLR combining of the PBCH payload 230, the UE 115-a may decode the corresponding PBCH, where a number of instances of the SSB 210 in which the UE 115-a monitors for the PBCH payload 230 may be equal to a number of the PSSs 220 in the SSB 210-a.

In some examples, the base station 105-a and the UE 115-a may support a set of periodicity values corresponding to the SSB 210, which may enable the UE 115-a to use a reduced number of frequency offset hypotheses for an initial access procedure with a cell (e.g., InitAcq). For example, the UE 115-a may perform an initial SSB periodicity assessment based on PSS detector outputs and observations regarding a number of existing PSS repetitions. In some cases, possible SSB burst sizes and a number of beams that the UE 115-a may accommodate in an SSB burst or an SSB beam sweep may vary corresponding to different periodicity values. For example, the set of periodicity values may include a periodicity of 2.5 ms, which may enable the UE 115-a to combine two consecutive SSBs 210 while using at least six frequency offset hypotheses. In addition, the 2.5 ms periodicity may cause a corresponding SSB burst size and number of beams accommodated in the SSB burst to decrease.

Additionally or alternatively, the base station 105-a and the UE 115-a may utilize SSB identifier repetitions, SSB beam repetitions, or both within an SSB burst. In some examples, the UE 115-a may perform an SSB beam sweep, the base station 105-a may repeat each SSB 210 at least twice on the same beam (e.g., back-to-back, or according to a pre-defined time gap) instead of transmitting each SSB 210 on a different beam once per SSB burst. For example, the UE 115-a may monitor for additional instances of the SSB 210 in accordance with the frequency offset and on a same beam as the UE 115-a may monitor for the PSSs in the SSB 210-a. Repeating the SSBs 210 may result in at least two SSB blocks with a same beam identifier per SSB burst, a same SSB identifier per SSB burst, or both, which the UE 115-a may combine with a smaller time spacing between them. Additionally or alternatively, the UE 115-a may use SSB identifier repetitions, SSB beam repetitions, or both within an SSB burst to use a reduced number of frequency offset hypotheses for an initial access procedure, such that the UE 115-a may support the combining for increased SSB coverage.

Figure 3:
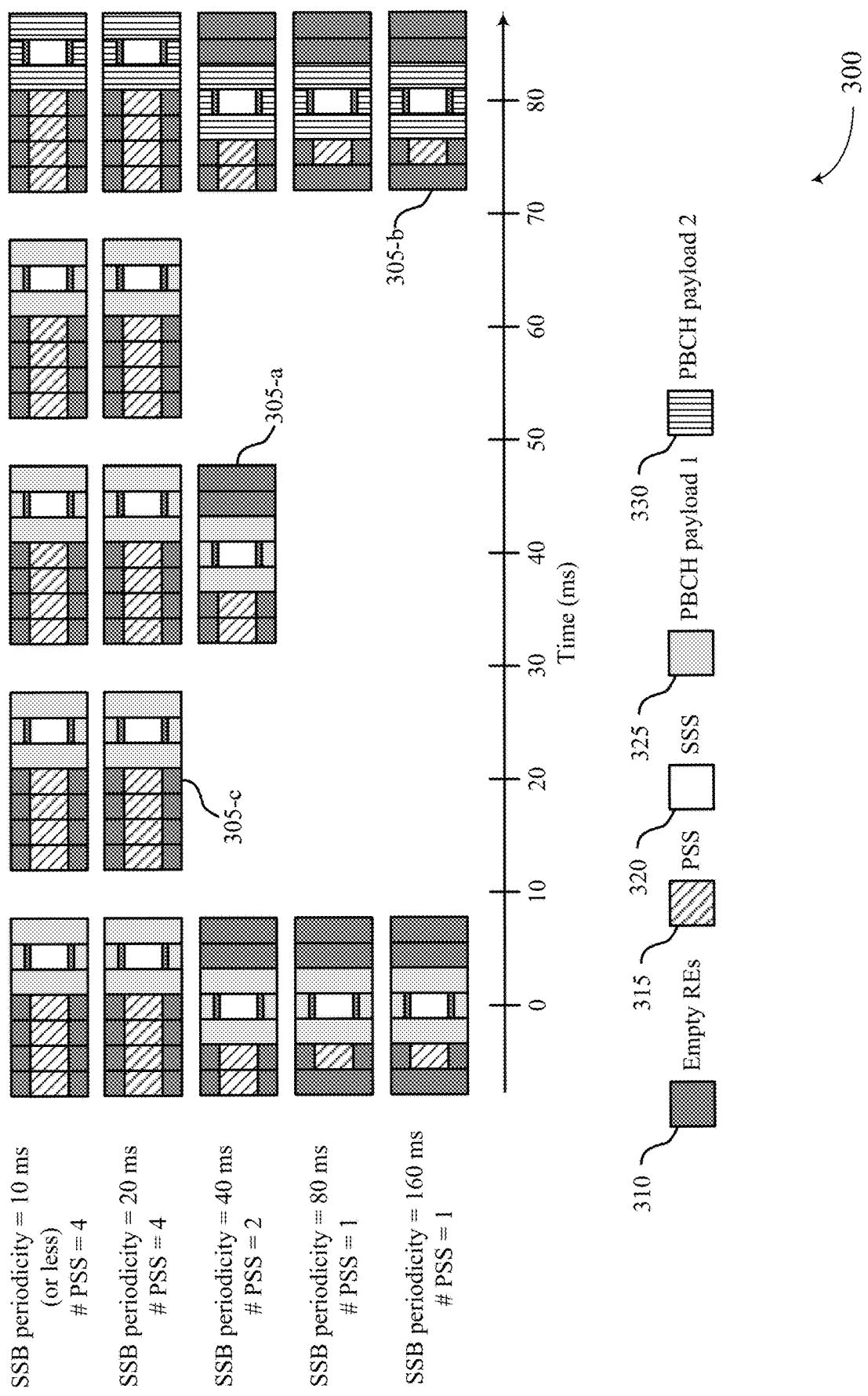
FIG. 3 illustrates an example of a set of SSB formats that supports SSB coverage extension for a sub-THz band in accordance with aspects of the present disclosure.

FIG. 3 illustrates an example of a set of SSB formats 300 that supports SSB coverage extension for a sub-THz band in accordance with aspects of the present disclosure. In some examples, the set of SSB formats 300 may implement aspects of the wireless communications systems 100 and 200 or may be implemented by aspects of the wireless communications systems 100 and 200. The set of SSB formats 300 may include multiple SSBs 305 with different formats including different components (e.g., signal types) spanning seven OFDM symbols. In some cases, the symbols may include empty REs 310, PSSs 315, SSSs 320, PBCH payloads 325 (e.g., PBCH payload 1), PBCH payloads 330 (e.g., PBCH payload 2), or any combination thereof.

An SSB 305 may include different components and different numbers of PSS repetitions as a function of SSB periodicity (e.g., 5 ms, 10 ms, 20 ms, 40 ms, 80 ms, and 160 ms) and an SSB period time (e.g., time span, 0) ms to 80 ms). As described with reference to FIG. 2, a UE may perform combining (e.g., non-coherent combining, coherent combining) of two or more PSSs 315 in a first instance of an SSB 305 to detect the SSB 305 and extend SSB coverage in a sub-THz band. In some examples, the UE may be enabled to combine SSSs 320, PBCH payloads 325, and PBCH payloads 330 in a similar way as the PSSs 315. For example, the UE may monitor for a first SSS 320 in a first instance of the SSB 305 and one or more additional SSSs 320 in an additional instance of the SSB 305. In some cases, the UE may combine the first SSS 320 and the one or more additional SSSs 320, where a number of SSSs 320 that are combined may be equal to a number of the PSSs 315 in the first instance of the SSB 305.

Additionally, the UE may monitor for a PBCH payload 325 (e.g., if the time span is less than 80 ms) or a PBCH payload 330 (e.g., if the time span is 80 ms or greater) in the first instance and any additional instances of the SSB 305. Based on LLR combining of the PBCH payload 325, the UE may decode the corresponding PBCH, where a number of instances of the SSB 305 in which the UE monitors for the PBCH payload 325 may be equal to a number of the PSSs 315 in the first instance of the SSB 305. In some examples, the UE may take a number of SSB repetitions into account for SSS combining and PBCH decoding once the UE confirms an existence of an SSB 305 in a specific slot that is aligned with the assumed SSB periodicity by PSS correlation on the specific slot.

In some examples, while PSS sequences and SSS sequences (e.g., which are derived from a corresponding cell identifier) may remain constant over a given time span (e.g., until the UE moves to another cell), a PBCH signal may carry the same PBCH payload 325 (e.g., the PBCH payload 1) during (e.g., over the course of) an 80 ms time span. That is, a threshold time span for a PBCH payload 325 to remain constant may be 80 ms. In some examples, the threshold time span may predetermined to be longer (e.g., 160 ms) or shorter than 80 ms. Because of the PBCH payload 325 remaining constant during the threshold time span, the UE may use LLR combining for the PBCH payloads 325 during the threshold time span (e.g., where the same PBCH payload 325 may be repeated every 20 ms). Put another way, for an SSB periodicity (e.g., time span) that satisfies the threshold time span of 80 ms, the UE may allocate a same number of PSSs 315 to an SSB 305 (e.g., an SSB 305-a) as the number of PBCH repetitions that exist during that time span. For an SSB periodicity (e.g., time span) that is equal to or greater than the threshold time span of 80 ms, the UE may allocate a single PSS 315 per SSB 305 (e.g., an SSB 305-b) because there may be one PBCH repetition (e.g., a single PBCH payload 325, the PBCH payload 2) during that time span, and the UE may be unable to perform LLR combining (e.g., given the existence of the single PBCH repetition and the fact that the UE is unable to combine the PBCH pay loads 325 with the PBCH payloads 330).

In some examples, the UE may determine the number of PSSs 315 (e.g., PSS symbols) per SSB 305 using a PBCH payload periodicity (e.g., a periodicity of a PBCH payload 325) and a time period (e.g., 0 ms to 80 ms). For example, for an SSB periodicity of 40 ms, the UE may allocate two PSSs 315 per SSB because two PBCH repetitions (e.g., two repetitions of the PBCH payload 325) may exist for the SSB periodicity of 40 ms, which the UE may decode using LLR combining. For example, the UE may monitor for two PSSs 315 in the SSB 305-a based on the periodicity of the SSB 305-a being half of a PBCH payload periodicity. That is, for the time span of 0 ms to 80 ms, if the SSB periodicity is 40 ms, the UE may allocate two PSSs 315 to an SSB 305. For an SSB periodicity of 20 ms, the UE may allocate four PSSs 315 per SSB 305 because four PBCH repetitions (e.g., four repetitions of the PBCH payload 325) may exist for the SSB periodicity of 20 ms, which the UE may decode using LLR combining. For example, the UE may monitor for four PSSs 315 in the SSB 305-c a based on the periodicity of the SSB 305-c being a quarter or less of a PBCH payload periodicity. In some examples, for an SSB periodicity of 10 ms and lower, the UE may allocate up to eight PSSs 315 per SSB 305 because at least eight PBCH repetitions (e.g., at least eight repetitions of the PBCH payload 325) may exist for the SSB periodicity of 10 ms and lower, which the UE may decode using LLR combining. For example, the UE may monitor for eight PSSs 315 in an SSB 305 based on the periodicity of the SSB 305 being an eighth or less of a PBCH payload periodicity, where the SSB 305 may occupy a more than half of a slot.

In some examples, the UE may determine the number of PSSs 315 in an SSB 305 based on the periodicity of the SSB 305 with respect to a PBCH payload periodicity, which may be greater than or equal to 80 ms. Additionally or alternatively, the UE may determine the periodicity of the SSB 305 based on a number of PSSs 315 in the first instance of the SSB 305. In some cases, the UE may refrain from using more than eight PSSs 315 (e.g., 16 PSSs 315 for a 5 ms SSB periodicity) because more than eight PSSs 315 may exceed a single slot boundary for a single SSB 305. However, using more than four PSS repetitions per SSB 305 may cause a single SSB 305 to occupy more than half a slot (e.g., 7 symbols). As such, the base station may mostly use SSB periodicities of 20 ms and lower. In some examples, for every SSB periodicity, there may be a preconfigured number of PSS repetitions per SSB 305 that may enable an extended range of SSB detection and SSB coverage. In some cases, while monitoring for the PSSs 315 (e.g., during an InitAcq procedure), the UE may combine different quantities of PSS symbols (e.g., per SSB 305 and according to a set of preconfigured SSB periodicities). For at least one combination, the UE may successfully detect a correct sequence, time, frequency, beam hypothesis, or any combination thereof corresponding to the SSB 305. The UE may also use the PSS detection results to assess an SSB periodicity (e.g., before master information block (MIB) decoding) based on a number of PSS repetitions per SSB periodicity.

Figure 4:
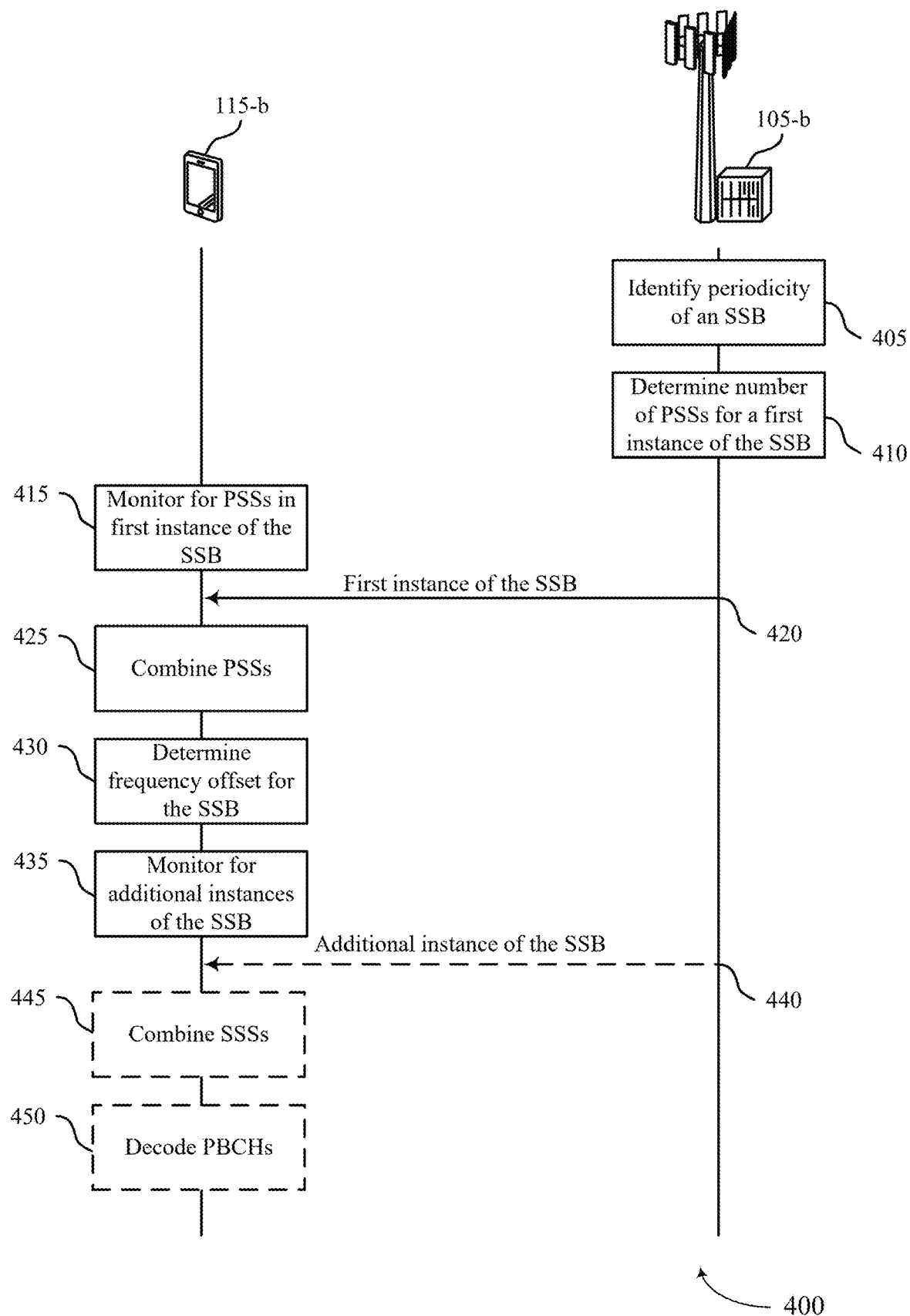
FIG. 4 illustrates an example of a process flow that supports SSB coverage extension for a sub-THz band in accordance with aspects of the present disclosure.

FIG. 4 illustrates an example of a process flow 400 that supports SSB coverage extension for a sub-THz band in accordance with aspects of the present disclosure. The process flow 400 may implement aspects of wireless communications systems 100 and 200, or may be implemented by aspects of the wireless communications system 100 and 200. For example, the process flow 400 may illustrate operations between a UE 115-b and a base station 105-b, which may be examples of corresponding devices described herein. In the following description of the process flow 400, the operations between the UE 115-b and the base station 105-b may be transmitted in a different order than the example order shown, or the operations performed by the UE 115-b and the base station 105-b may be performed in different orders or at different times. Some operations may also be omitted from the process flow 400, and other operations may be added to the process flow 400.

At 405, the base station 105-b may identify a periodicity of an SSB to be periodically broadcast. For example, the periodicity of the SSB may be 5 ms, 10 ms, 20 ms, 40 ms, 80 ms, or 160 ms. At 410, the base station 105-b may determine a number of PSSs to include in a first instance of the SSB based on the periodicity of the SSB. In some examples, the PSSs may be in adjacent (e.g., consecutive) symbols of the SSB or non-adjacent (e.g., non-consecutive) symbols of the SBS. The SSB may also include any combination of empty REs, SSSs, PBCHs, or other signal types.

At 415, the UE 115-b may monitor for multiple PSSs in a first instance of the SSB. For example, the UE 115-b may monitor for two adjacent or two non-adjacent PSSs. At 420, the base station 105-b may transmit the first instance of the SSB with the multiple PSSs in accordance with the number of PSSs determined based on the periodicity of the SSB. For example, the base station 105-b may transmit the first instance of the SSB with two PSSs in addition to any combination of empty REs, SSSs, PBCHs, or other signals spanning the SSB (e.g., seven OFDM symbols).

At 425, the UE 115-b may combine the multiple PSSs from the first instance of the SSB based on monitoring for the PSSs. The combining may include non-coherent combining or coherent combining.

At 430, the UE 115-b may determine, based on the combining, a frequency offset for the SSB. In some examples, the UE 115-b may determine the frequency offset using a frequency offset refinement procedure, which is based on one or more frequency offset hypotheses.

At 435, the UE 115-b may monitor for additional instances of the SSB in accordance with the frequency offset. For example, the UE 115-b may monitor for the additional instances of the SSB, which the base station 105-b may transmit with a particular periodicity. At 440, the base station 105-b may transmit the one or more additional instances of the SSB. In some examples, the one or more additional instances of the SSB may include PSSs, SSSs, PBCHs, or any combination thereof.

At 445, the UE 115-b may combine a first SSS from the first instance of the SSB and one or more additional SSSs from the one or more additional instances of the SSB, where a number of the SSSs combined is equal to the number of the PSSs in the first instance of the SSB. For example, if the first instance of the SSB includes two PSSs, then the UE 115-b may combine two SSSs across the first and additional instances of the SSB.

At 450, the UE 115-b may decode a PBCH from the first and one or more additional instances of the SSB based on an LLR combining, where a number of instances of the SSB in which the UE 115-b monitors for the PBCH is equal to the number of the PSSs in the first instance of the SSB. That is, the UE 115-b may allocate the same number of PSSs to an SSB as there are repetitions of a PBCH in a particular time span.

Figure 5:
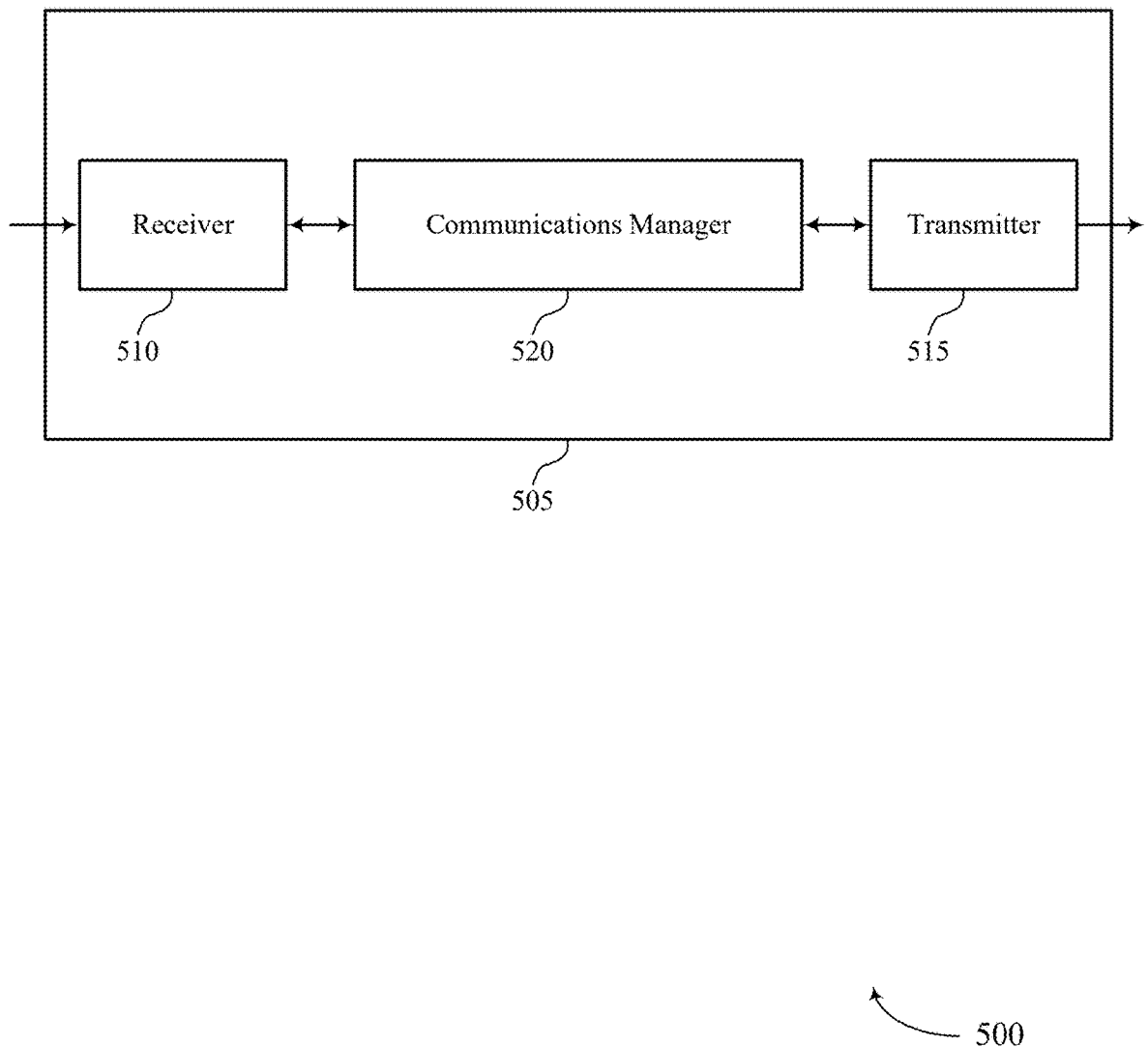
FIGS. 5 and 6 show block diagrams of devices that support SSB coverage extension for a sub-THz band in accordance with aspects of the present disclosure.

FIG. 5 shows a block diagram 500 of a device 505 that supports SSB coverage extension for a sub-THz band in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to SSB coverage extension for a sub-THz band). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to SSB coverage extension for a sub-THz band). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of SSB coverage extension for a sub-THz band as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for monitoring for a set of multiple PSSs in a first instance of an SSB, where a number of PSSs in the first instance of the SSB is based on a periodicity of the SSB. The communications manager 520 may be configured as or otherwise support a means for combining the set of multiple PSSs from the first instance of the SSB based on the monitoring. The communications manager 520 may be configured as or otherwise support a means for determining, based on the combining, a frequency offset for the SSB. The communications manager 520 may be configured as or otherwise support a means for monitoring for additional instances of the SSB in accordance with the frequency offset.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for SSB coverage extension in a sub-THz band, which may reduce power consumption and SSB-related signaling overhead at a base station and a UE.

Figure 6:
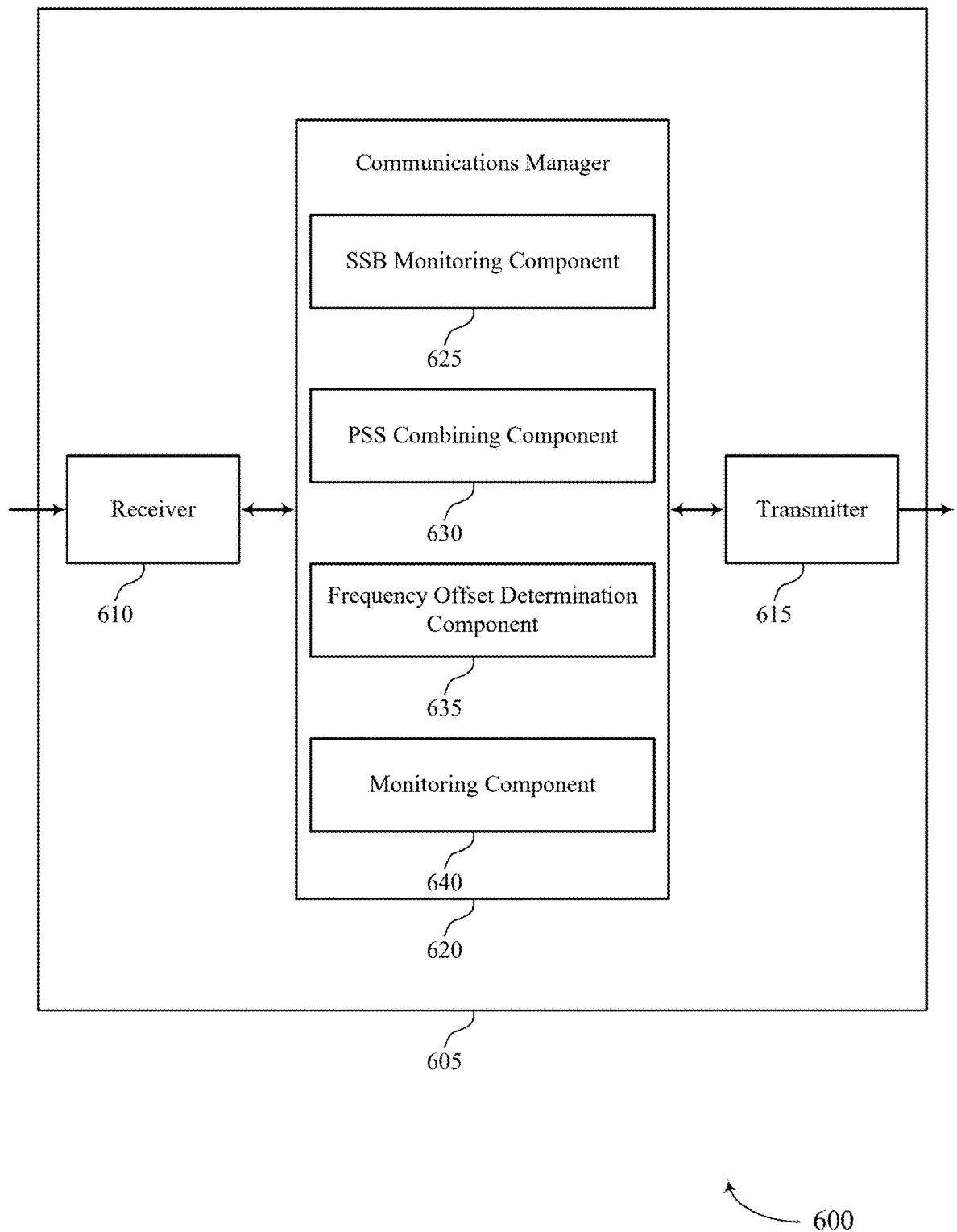

FIG. 6 shows a block diagram 600 of a device 605 that supports SSB coverage extension for a sub-THz band in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to SSB coverage extension for a sub-THz band). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to SSB coverage extension for a sub-THz band). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of SSB coverage extension for a sub-THz band as described herein. For example, the communications manager 620 may include an SSB monitoring component 625, a PSS combining component 630, a frequency offset determination component 635, a monitoring component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The SSB monitoring component 625 may be configured as or otherwise support a means for monitoring for a set of multiple PSSs in a first instance of an SSB, where a number of PSSs in the first instance of the SSB is based on a periodicity of the SSB. The PSS combining component 630 may be configured as or otherwise support a means for combining the set of multiple PSSs from the first instance of the SSB based on the monitoring. The frequency offset determination component 635 may be configured as or otherwise support a means for determining, based on the combining, a frequency offset for the SSB. The monitoring component 640 may be configured as or otherwise support a means for monitoring for additional instances of the SSB in accordance with the frequency offset.

Figure 7:
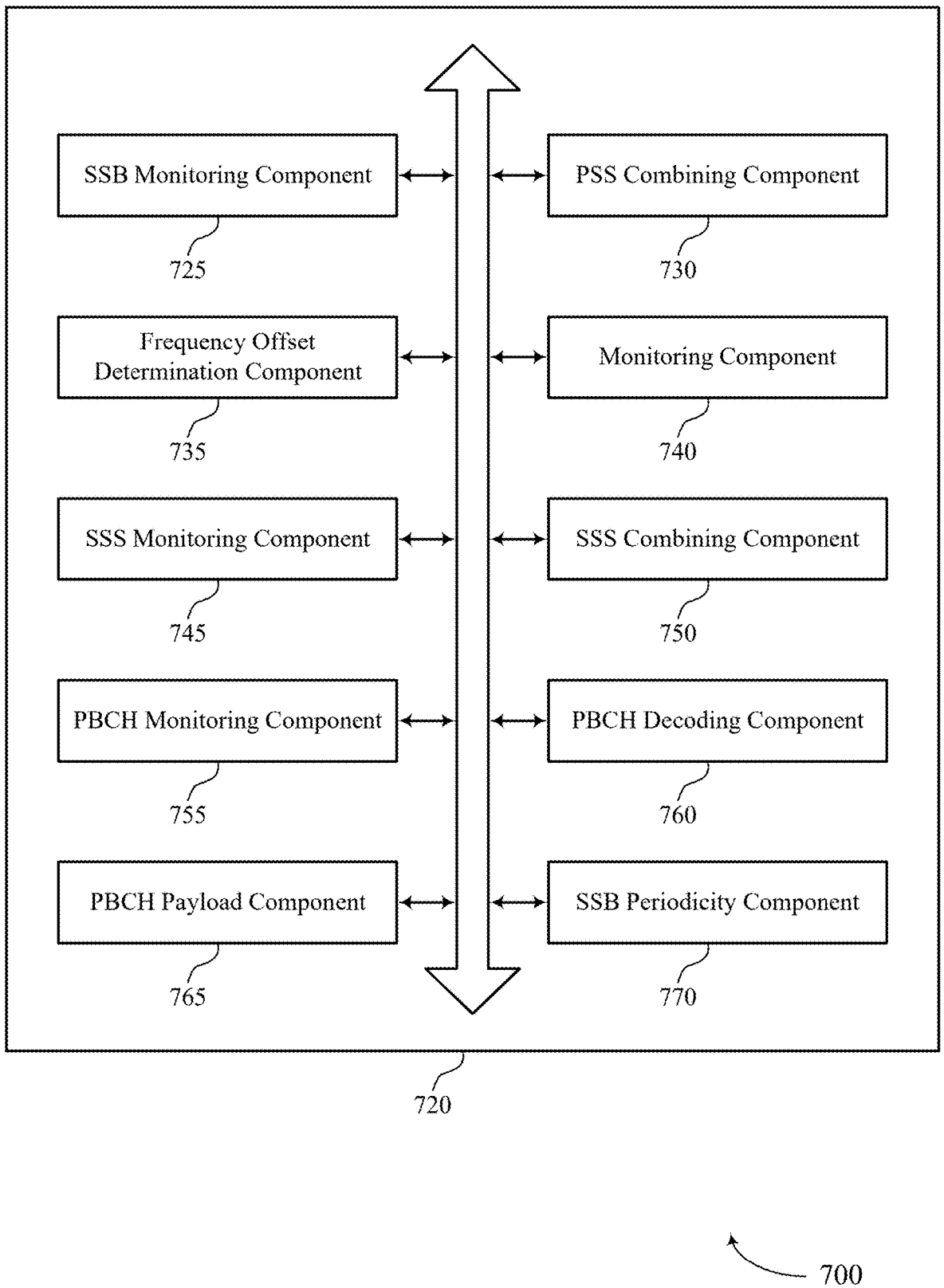
FIG. 7 shows a block diagram of a communications manager that supports SSB coverage extension for a sub-THz band in accordance with aspects of the present disclosure.

FIG. 7 shows a block diagram 700 of a communications manager 720 that supports SSB coverage extension for a sub-THz band in accordance with aspects of the present disclosure. The communications manager 720 may be an example of aspects of a communications manager 520, a communications manager 620, or both, as described herein. The communications manager 720, or various components thereof, may be an example of means for performing various aspects of SSB coverage extension for a sub-THz band as described herein. For example, the communications manager 720 may include an SSB monitoring component 725, a PSS combining component 730, a frequency offset determination component 735, a monitoring component 740, an SSS monitoring component 745, an SSS combining component 750, a PBCH monitoring component 755, a PBCH decoding component 760, a PBCH payload component 765, an SSB periodicity component 770, or any combination thereof. Each of these components may communicate, directly or indirectly, with one another (e.g., via one or more buses).

The communications manager 720 may support wireless communication at a UE in accordance with examples as disclosed herein. The SSB monitoring component 725 may be configured as or otherwise support a means for monitoring for a set of multiple PSSs in a first instance of an SSB, where a number of PSSs in the first instance of the SSB is based on a periodicity of the SSB. The PSS combining component 730 may be configured as or otherwise support a means for combining the set of multiple PSSs from the first instance of the SSB based on the monitoring. The frequency offset determination component 735 may be configured as or otherwise support a means for determining, based on the combining, a frequency offset for the SSB. The monitoring component 740 may be configured as or otherwise support a means for monitoring for additional instances of the SSB in accordance with the frequency offset.

In some examples, the SSS monitoring component 745 may be configured as or otherwise support a means for monitoring for a first SSS in the first instance of the SSB. In some examples, the SSS monitoring component 745 may be configured as or otherwise support a means for monitoring for one or more additional SSSs in the additional instances of the SSB. In some examples, the SSS combining component 750 may be configured as or otherwise support a means for combining the first SSS and the one or more additional SSSs, where a number of SSSs combined is equal to the number of the set of multiple PSSs in the first instance of the SSB.

In some examples, the PBCH monitoring component 755 may be configured as or otherwise support a means for monitoring for a PBCH in the first instance of the SSB. In some examples, the PBCH monitoring component 755 may be configured as or otherwise support a means for monitoring for the PBCH in the additional instances of the SSB. In some examples, the PBCH decoding component 760 may be configured as or otherwise support a means for decoding the PBCH based on a LLR combining of the PBCH being monitored in each of the first instance of the SSB and in the additional instances of the SSB, where a number of instances of the SSB in which the PBCH is monitored is equal to the number of the set of multiple PSSs in the first instance of the SSB.

In some examples, to support determining the frequency offset for the SSB, the frequency offset determination component 735 may be configured as or otherwise support a means for determining one or more frequency offset hypotheses based on the combining of the set of multiple PSSs from the first instance of the SSB. In some examples, to support determining the frequency offset for the SSB, the frequency offset determination component 735 may be configured as or otherwise support a means for determining the frequency offset through a frequency offset refinement procedure based on a single instance of the one or more frequency offset hypotheses.

In some examples, to support monitoring for the set of multiple PSSs in the first instance of the SSB, the SSB monitoring component 725 may be configured as or otherwise support a means for monitoring for two or more PSSs that are in adjacent symbols of the first instance of the SSB.

In some examples, to support monitoring for the set of multiple PSSs in the first instance of the SSB, the SSB monitoring component 725 may be configured as or otherwise support a means for monitoring for two or more PSSs that are in non-adjacent symbols of the first instance of the SSB. In some examples, the number of the set of multiple PSSs in the first instance of the SSB is further based on a target SNR for acquisition of the SSB.

In some examples, to support monitoring for the set of multiple PSSs the first instance of the SSB, the SSB monitoring component 725 may be configured as or otherwise support a means for monitoring for two PSSs in the first instance of the SSB based on the periodicity of the SSB being half a PBCH payload periodicity.

In some examples, to support monitoring for the set of multiple PSSs in the first instance of the SSB, the PBCH payload component 765 may be configured as or otherwise support a means for monitoring for four PSSs in the first instance of the SSB based on the periodicity of the SSB being a quarter or less of a PBCH payload periodicity.

In some examples, to support monitoring for the set of multiple PSSs in the first instance of the SSB, the PBCH payload component 765 may be configured as or otherwise support a means for monitoring for eight PSSs in the first instance of the SSB based on the periodicity of the SSB being an eighth or less of a PBCH payload periodicity, where the first instance of the SSB occupies a portion of a single slot, the portion being more than a half-slot.

In some examples, the number of PSSs in the first instance of the SSB is further based on the periodicity of the SSB with respect to a PBCH payload periodicity. In some examples, the PBCH payload periodicity is 80 ms. In some examples, the PBCH payload periodicity is greater than 80 ms.

In some examples, the SSB periodicity component 770 may be configured as or otherwise support a means for determining the periodicity of the SSB based on the number of the set of multiple PSSs in the first instance of the SSB.

In some examples, to support monitoring for the additional instances of the SSB, the monitoring component 740 may be configured as or otherwise support a means for monitoring for the additional instances of the SSB in accordance with the frequency offset and on a same beam as the monitoring for the set of multiple PSSs in the first instance of the SSB. In some examples, to support monitoring for the set of multiple PSSs, the SSB monitoring component 725 may be configured as or otherwise support a means for monitoring for the set of multiple PSSs in the first instance of the SSB in a sub-THz band.

In some examples, the PSS combining component 730 may be configured as or otherwise support a means for combining the set of multiple PSSs from the first instance of the SSB includes non-coherent combining. In some examples, the PSS combining component 730 may be configured as or otherwise support a means for combining the set of multiple PSSs from the first instance of the SSB includes coherent combining.

Figure 8:
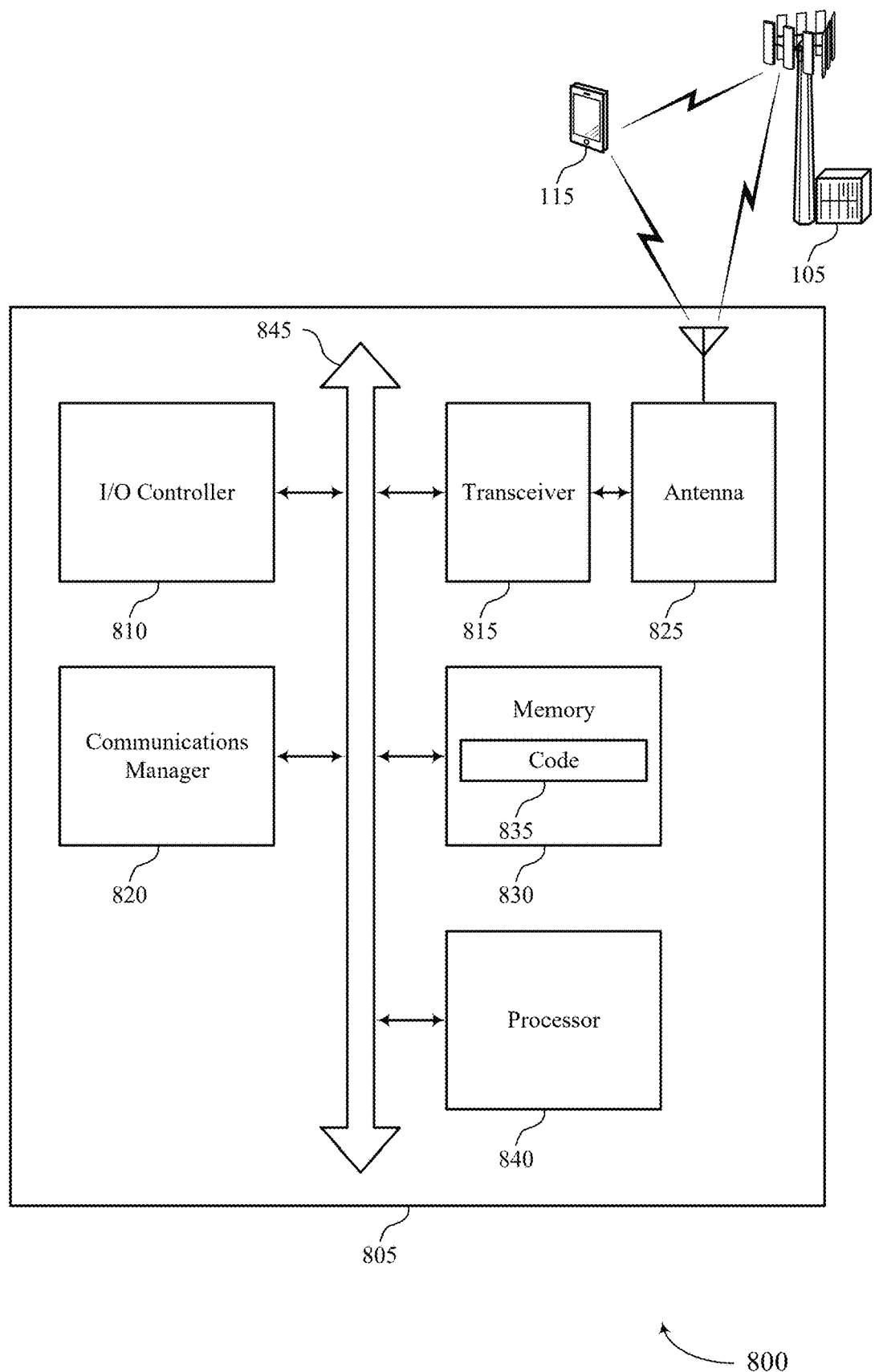
FIG. 8 shows a diagram of a system including a device that supports SSB coverage extension for a sub-THz band in accordance with aspects of the present disclosure.

FIG. 8 shows a diagram of a system 800 including a device 805 that supports SSB coverage extension for a sub-THz band in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOSR, ANDROIDR, MS-DOSR, MS-WINDOWS®, OS/2R, UNIXR, LINUXR, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting SSB coverage extension for a sub-THz band). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for monitoring for a set of multiple PSSs in a first instance of an SSB, where a number of PSSs in the first instance of the SSB is based on a periodicity of the SSB. The communications manager 820 may be configured as or otherwise support a means for combining the set of multiple PSSs from the first instance of the SSB based on the monitoring. The communications manager 820 may be configured as or otherwise support a means for determining, based on the combining, a frequency offset for the SSB. The communications manager 820 may be configured as or otherwise support a means for monitoring for additional instances of the SSB in accordance with the frequency offset.

By including or configuring the communications manager 820 in accordance with examples as described herein, the device 805 may support techniques for SSB coverage extension in a sub-THz band, which may reduce power consumption and SSB-related signaling overhead at a base station and a UE.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of SSB coverage extension for a sub-THz band as described herein, or the processor 840 and the memory 830 may be otherwise configured to perform or support such operations.

Figure 9:
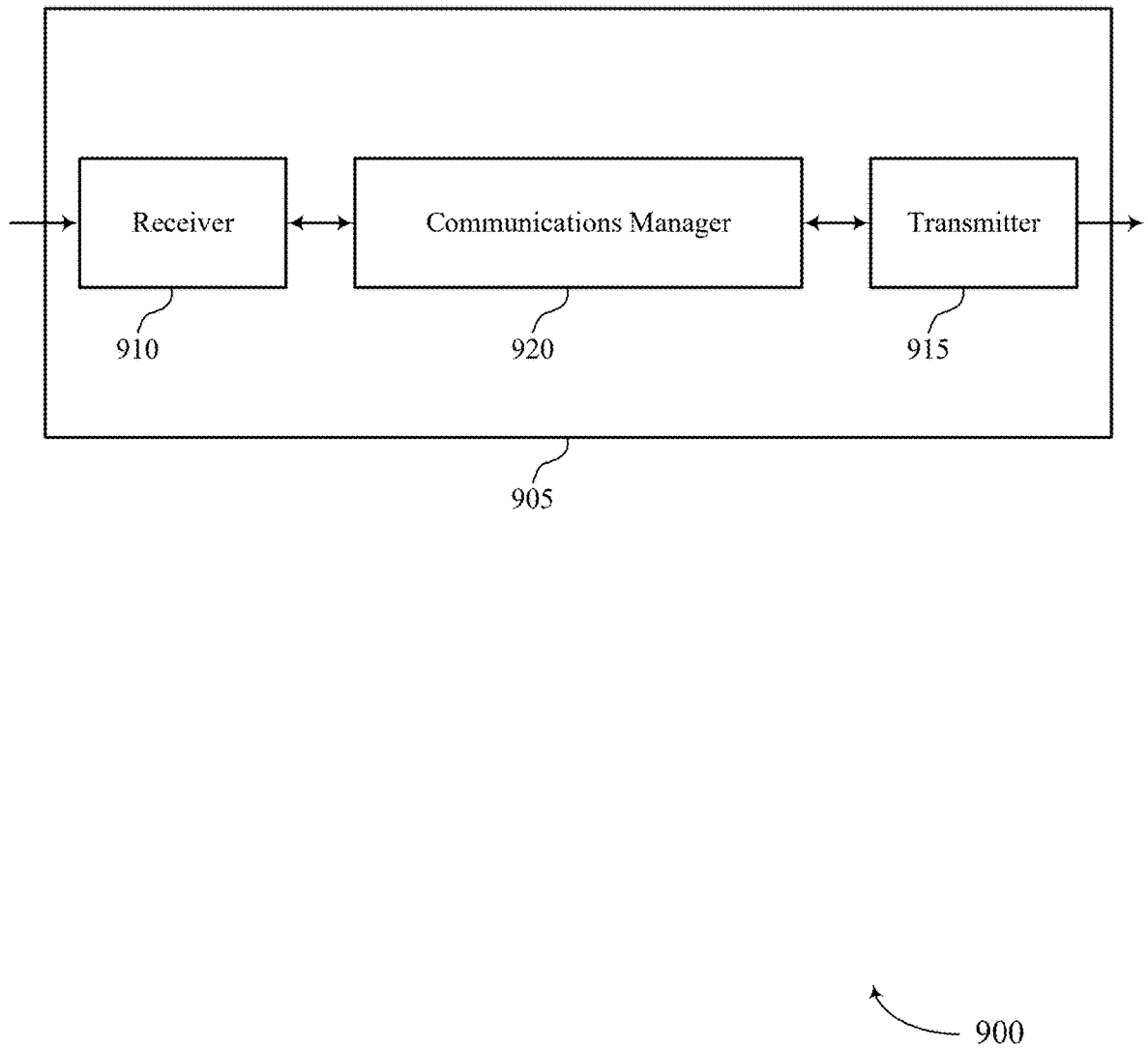
FIGS. 9 and 10 show block diagrams of devices that support SSB coverage extension for a sub-THz band in accordance with aspects of the present disclosure.

FIG. 9 shows a block diagram 900 of a device 905 that supports SSB coverage extension for a sub-THz band in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to SSB coverage extension for a sub-THz band). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to SSB coverage extension for a sub-THz band). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of SSB coverage extension for a sub-THz band as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for identifying a periodicity of an SSB to be periodically broadcast. The communications manager 920 may be configured as or otherwise support a means for determining a number of PSSs to include in a first instance of the SSB based on the periodicity of the SSB. The communications manager 920 may be configured as or otherwise support a means for transmitting the first instance of the SSB with a set of multiple PSSs in accordance with the number of PSSs determined based on the periodicity of the SSB.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for SSB coverage extension in a sub-THz band, which may reduce power consumption and SSB-related signaling overhead at a base station and a UE.

Figure 10:
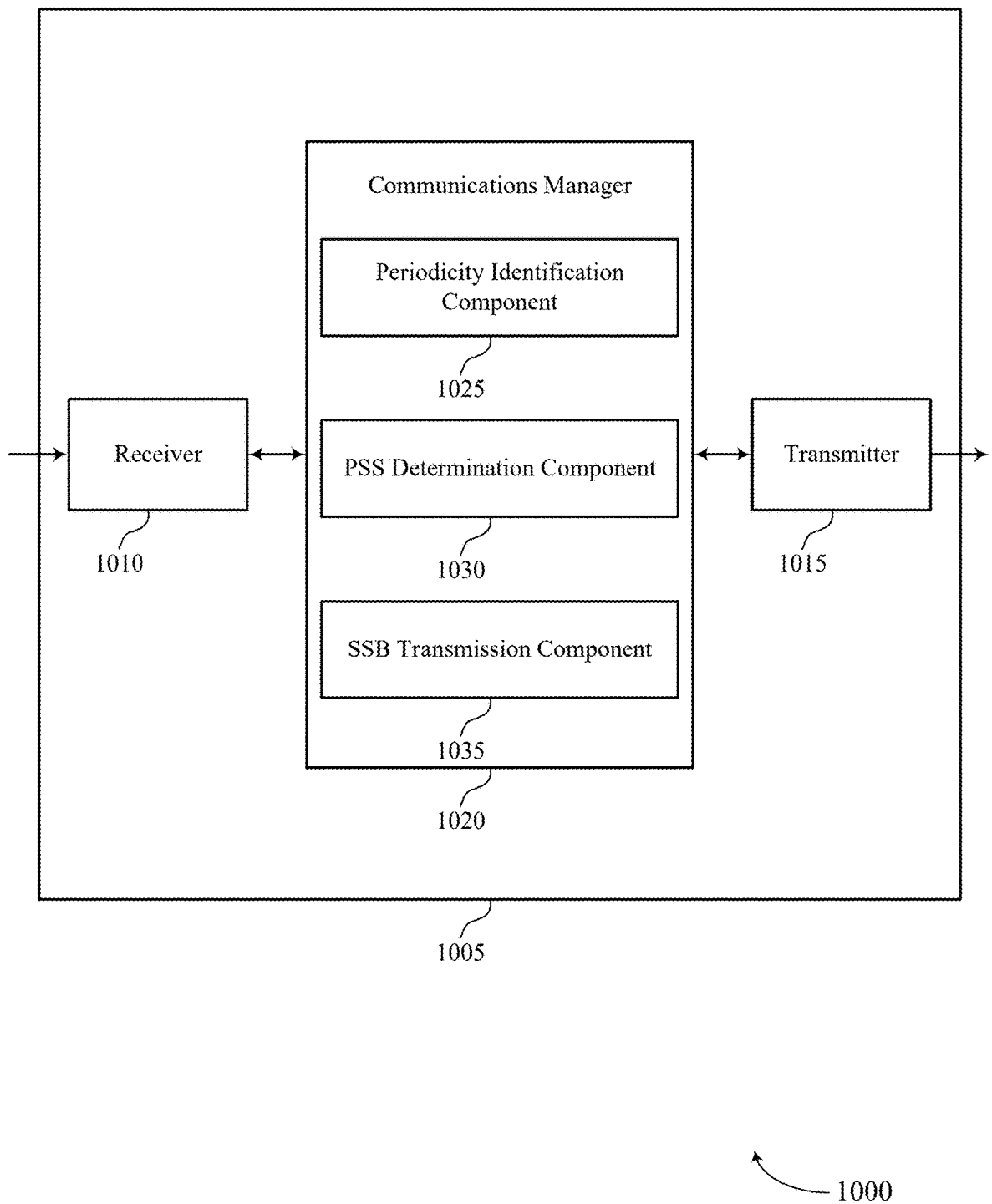

FIG. 10 shows a block diagram 1000 of a device 1005 that supports SSB coverage extension for a sub-THz band in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to SSB coverage extension for a sub-THz band). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to SSB coverage extension for a sub-THz band). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of SSB coverage extension for a sub-THz band as described herein. For example, the communications manager 1020 may include a periodicity identification component 1025, a PSS determination component 1030, an SSB transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The periodicity identification component 1025 may be configured as or otherwise support a means for identifying a periodicity of an SSB to be periodically broadcast. The PSS determination component 1030 may be configured as or otherwise support a means for determining a number of PSSs to include in a first instance of the SSB based on the periodicity of the SSB. The SSB transmission component 1035 may be configured as or otherwise support a means for transmitting the first instance of the SSB with a set of multiple PSSs in accordance with the number of PSSs determined based on the periodicity of the SSB.

Figure 11:
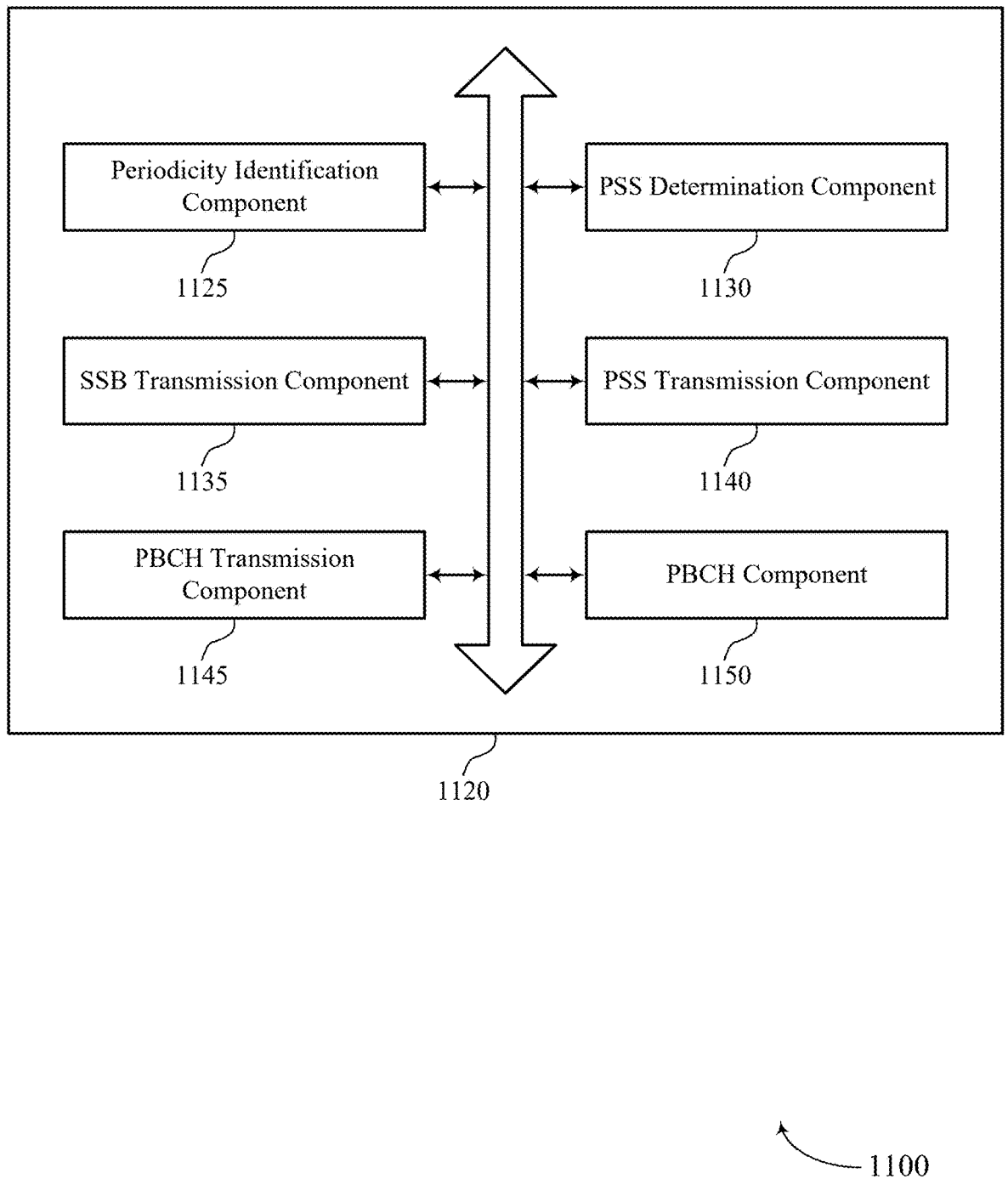
FIG. 11 shows a block diagram of a communications manager that supports SSB coverage extension for a sub-THz band in accordance with aspects of the present disclosure.

FIG. 11 shows a block diagram 1100 of a communications manager 1120 that supports SSB coverage extension for a sub-THz band in accordance with aspects of the present disclosure. The communications manager 1120 may be an example of aspects of a communications manager 920, a communications manager 1020, or both, as described herein. The communications manager 1120, or various components thereof, may be an example of means for performing various aspects of SSB coverage extension for a sub-THz band as described herein. For example, the communications manager 1120 may include a periodicity identification component 1125, a PSS determination component 1130, an SSB transmission component 1135, a PSS transmission component 1140, a PBCH transmission component 1145, a PBCH component 1150, or any combination thereof. Each of these components may communicate, directly or indirectly, with one another (e.g., via one or more buses).

The communications manager 1120 may support wireless communication at a base station in accordance with examples as disclosed herein. The periodicity identification component 1125 may be configured as or otherwise support a means for identifying a periodicity of an SSB to be periodically broadcast. The PSS determination component 1130 may be configured as or otherwise support a means for determining a number of PSSs to include in a first instance of the SSB based on the periodicity of the SSB. The SSB transmission component 1135 may be configured as or otherwise support a means for transmitting the first instance of the SSB with a set of multiple PSSs in accordance with the number of PSSs determined based on the periodicity of the SSB.

In some examples, the PSS transmission component 1140 may be configured as or otherwise support a means for transmitting a first SSS in the first instance of the SSB. In some examples, the PSS transmission component 1140 may be configured as or otherwise support a means for transmitting one or more additional SSSs in additional instances of the SSB.

In some examples, the PBCH transmission component 1145 may be configured as or otherwise support a means for transmitting a PBCH in the first instance of the SSB. In some examples, the PBCH transmission component 1145 may be configured as or otherwise support a means for transmitting the PBCH in additional instances of the SSB. In some examples, to support transmitting the first instance of the SSB with the set of multiple PSSs, the SSB transmission component 1135 may be configured as or otherwise support a means for transmitting two or more PSSs that are in adjacent symbols of the first instance of the SSB.

In some examples, to support transmitting the first instance of the SSB with the set of multiple PSSs, the SSB transmission component 1135 may be configured as or otherwise support a means for transmitting two or more PSSs that are in non-adjacent symbols of the first instance of the SSB. In some examples, the number of the set of multiple PSSs in the first instance of the SSB is further based on a target SNR for acquisition of the SSB.

In some examples, to support transmitting the first instance of the SSB with the set of multiple PSSs, the PBCH component 1150 may be configured as or otherwise support a means for transmitting two PSSs in the first instance of the SSB based on the periodicity of the SSB being half a PBCH payload periodicity.

In some examples, to support transmitting the first instance of the SSB with the set of multiple PSSs, the PBCH component 1150 may be configured as or otherwise support a means for transmitting four PSSs in the first instance of the SSB based on the periodicity of the SSB being a quarter or less of a PBCH payload periodicity.

In some examples, to support transmitting the first instance of the SSB with the set of multiple PSSs, the PBCH component 1150 may be configured as or otherwise support a means for transmitting eight PSSs in the first instance of the SSB based on the periodicity of the SSB being an eighth or less of a PBCH payload periodicity, where the first instance of the SSB occupies a portion of a single slot, the portion being more than a half-slot.

In some examples, the number of PSSs in the first instance of the SSB is further based on the periodicity of the SSB with respect to a PBCH payload periodicity. In some examples, the PBCH payload periodicity is 80 ms. In some examples, the PBCH payload periodicity is greater than 80 ms.

Figure 12:
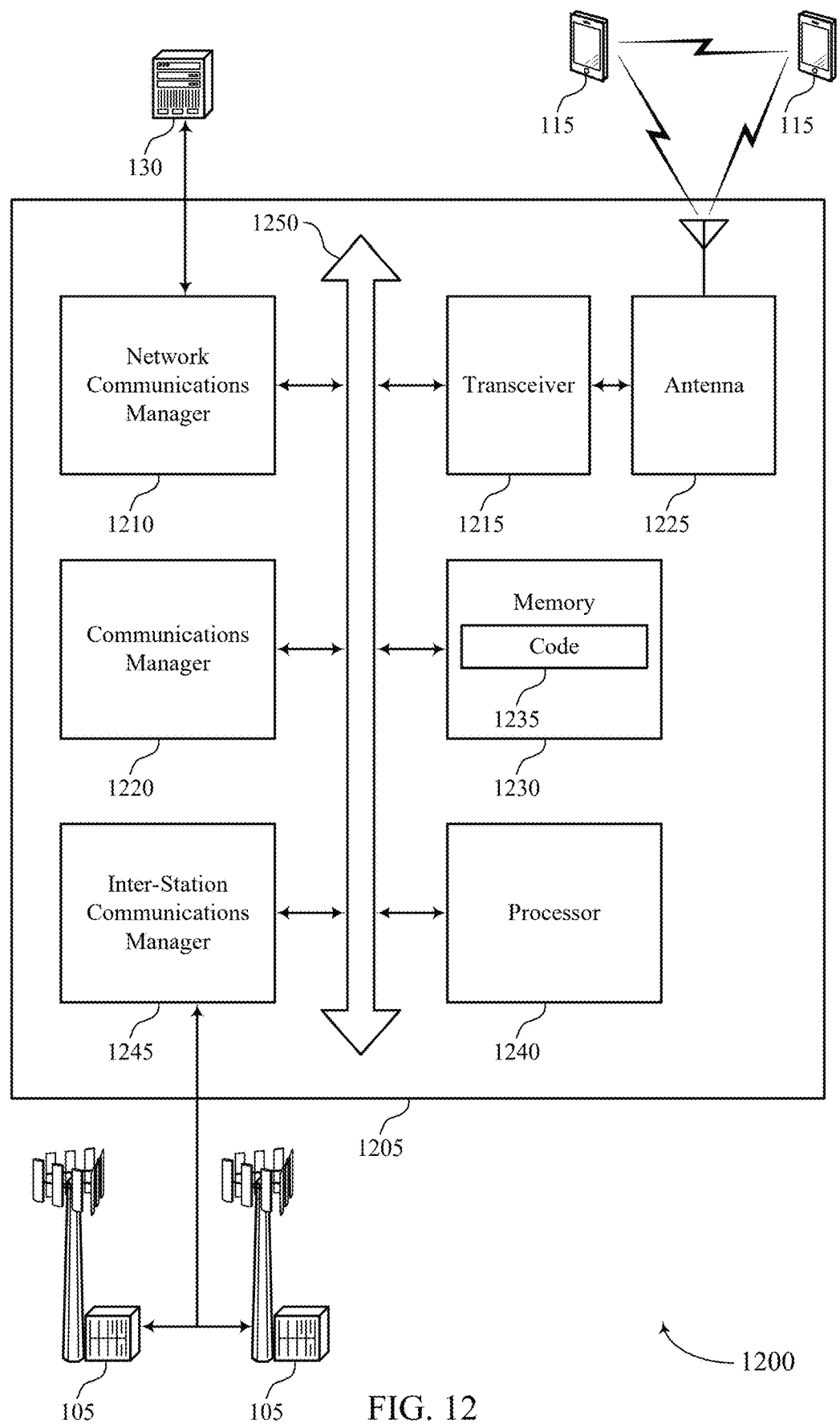
FIG. 12 shows a diagram of a system including a device that supports SSB coverage extension for sub-THz band in accordance with aspects of the present disclosure.

FIG. 12 shows a diagram of a system 1200 including a device 1205 that supports SSB coverage extension for a sub-THz band in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting SSB coverage extension for a sub-THz band). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for identifying a periodicity of an SSB to be periodically broadcast. The communications manager 1220 may be configured as or otherwise support a means for determining a number of PSSs to include in a first instance of the SSB based on the periodicity of the SSB. The communications manager 1220 may be configured as or otherwise support a means for transmitting the first instance of the SSB with a set of multiple PSSs in accordance with the number of PSSs determined based on the periodicity of the SSB.

By including or configuring the communications manager 1220 in accordance with examples as described herein, the device 1205 may support techniques for SSB coverage extension in a sub-THz band, which may reduce power consumption and SSB-related signaling overhead at a base station and a UE.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of SSB coverage extension for a sub-THz band as described herein, or the processor 1240 and the memory 1230 may be otherwise configured to perform or support such operations.

Figure 13:
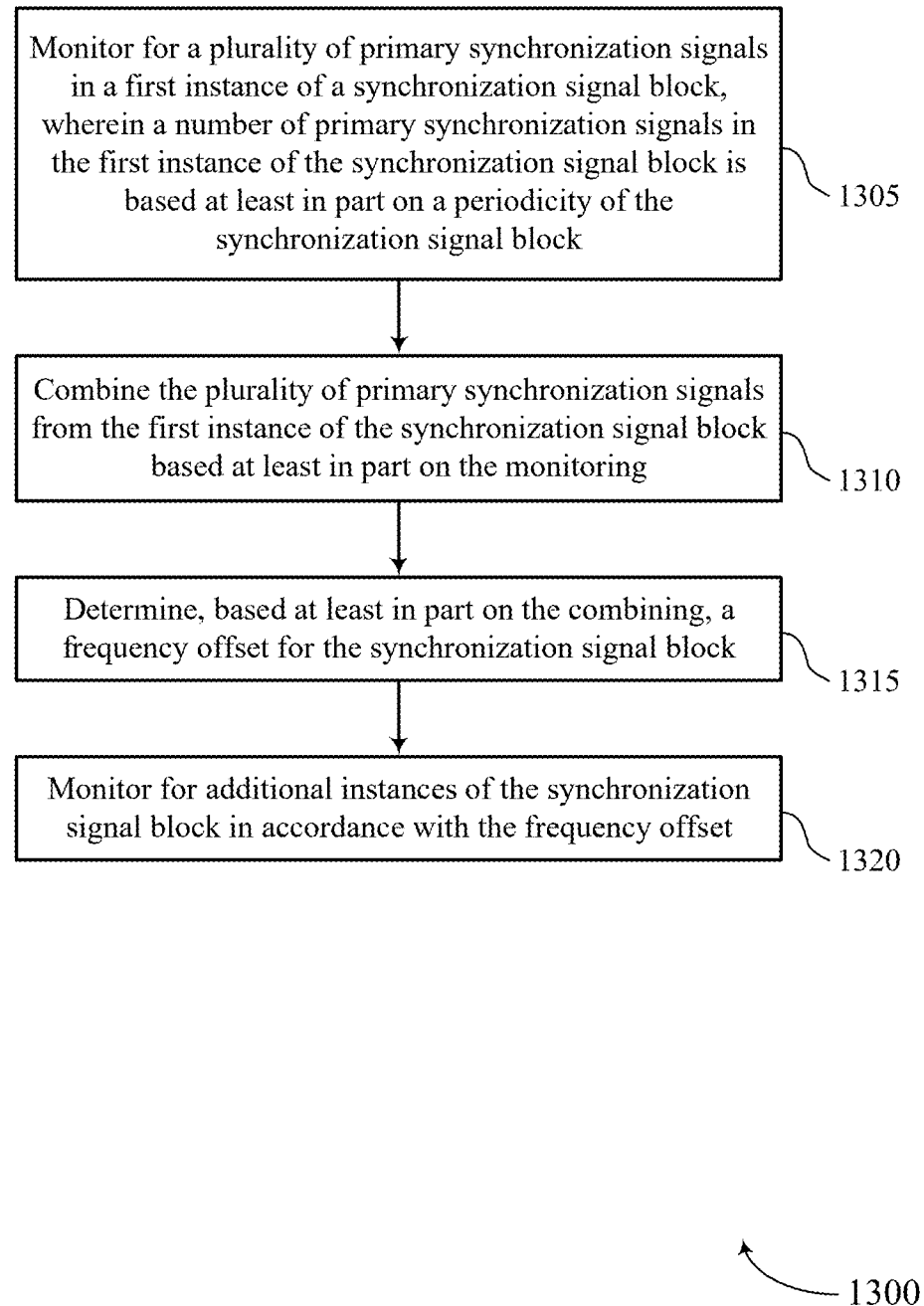
FIGS. 13 through 18 show flowcharts illustrating methods that support SSB coverage extension for a sub-THz band in accordance with aspects of the present disclosure.

FIG. 13 shows a flowchart illustrating a method 1300 that supports SSB coverage extension for a sub-THz band in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include monitoring for a set of multiple PSSs in a first instance of an SSB, where a number of PSSs in the first instance of the SSB is based on a periodicity of the SSB. The operations of 1305 may be performed in accordance with examples as disclosed herein. In some examples, aspects of the operations of 1305 may be performed by an SSB monitoring component 725 as described with reference to FIG. 7.

At 1310, the method may include combining the set of multiple PSSs from the first instance of the SSB based on the monitoring. The operations of 1310 may be performed in accordance with examples as disclosed herein. In some examples, aspects of the operations of 1310 may be performed by a PSS combining component 730 as described with reference to FIG. 7.

At 1315, the method may include determining, based on the combining, a frequency offset for the SSB. The operations of 1315 may be performed in accordance with examples as disclosed herein. In some examples, aspects of the operations of 1315 may be performed by a frequency offset determination component 735 as described with reference to FIG. 7.

At 1320, the method may include monitoring for additional instances of the SSB in accordance with the frequency offset. The operations of 1320 may be performed in accordance with examples as disclosed herein. In some examples, aspects of the operations of 1320 may be performed by a monitoring component 740 as described with reference to FIG. 7.

Figure 14:
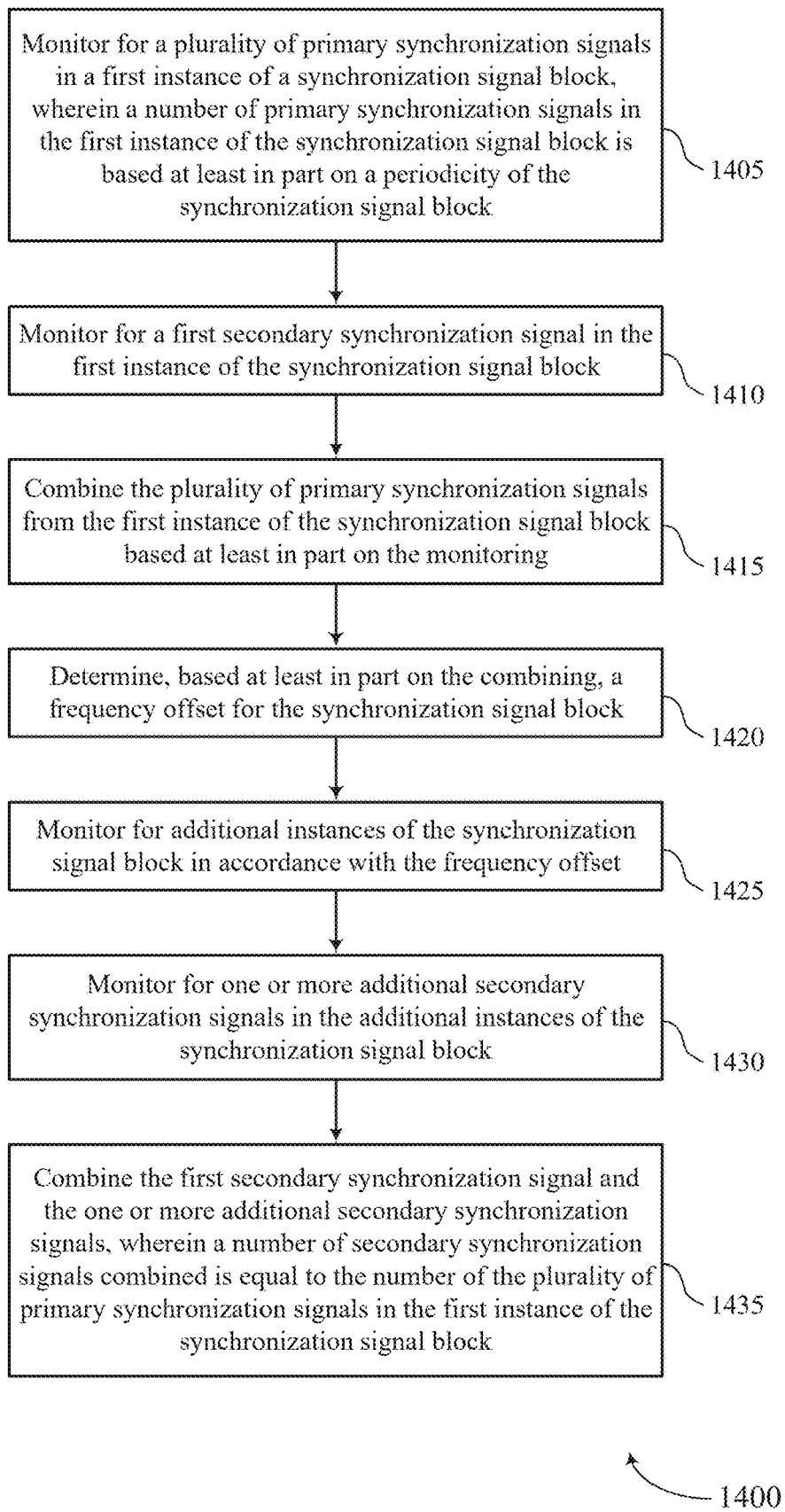

FIG. 14 shows a flowchart illustrating a method 1400 that supports SSB coverage extension for a sub-THz band in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include monitoring for a set of multiple PSSs in a first instance of an SSB, where a number of PSSs in the first instance of the SSB is based on a periodicity of the SSB. The operations of 1405 may be performed in accordance with examples as disclosed herein. In some examples, aspects of the operations of 1405 may be performed by an SSB monitoring component 725 as described with reference to FIG. 7.

At 1410, the method may include monitoring for a first SSS in the first instance of the SSB. The operations of 1410 may be performed in accordance with examples as disclosed herein. In some examples, aspects of the operations of 1410 may be performed by an SSS monitoring component 745 as described with reference to FIG. 7.

At 1415, the method may include combining the set of multiple PSSs from the first instance of the SSB based on the monitoring. The operations of 1415 may be performed in accordance with examples as disclosed herein. In some examples, aspects of the operations of 1415 may be performed by a PSS combining component 730 as described with reference to FIG. 7.

At 1420, the method may include determining, based on the combining, a frequency offset for the SSB. The operations of 1420 may be performed in accordance with examples as disclosed herein. In some examples, aspects of the operations of 1420 may be performed by a frequency offset determination component 735 as described with reference to FIG. 7.

At 1425, the method may include monitoring for additional instances of the SSB in accordance with the frequency offset. The operations of 1425 may be performed in accordance with examples as disclosed herein. In some examples, aspects of the operations of 1425 may be performed by a monitoring component 740 as described with reference to FIG. 7.

At 1430, the method may include monitoring for one or more additional SSSs in the additional instances of the SSB. The operations of 1430 may be performed in accordance with examples as disclosed herein. In some examples, aspects of the operations of 1430 may be performed by an SSS monitoring component 745 as described with reference to FIG. 7.

At 1435, the method may include combining the first SSS and the one or more additional SSSs, where a number of SSSs combined is equal to the number of the set of multiple PSSs in the first instance of the SSB. The operations of 1435 may be performed in accordance with examples as disclosed herein. In some examples, aspects of the operations of 1435 may be performed by an SSS combining component 750 as described with reference to FIG. 7.

Figure 15:
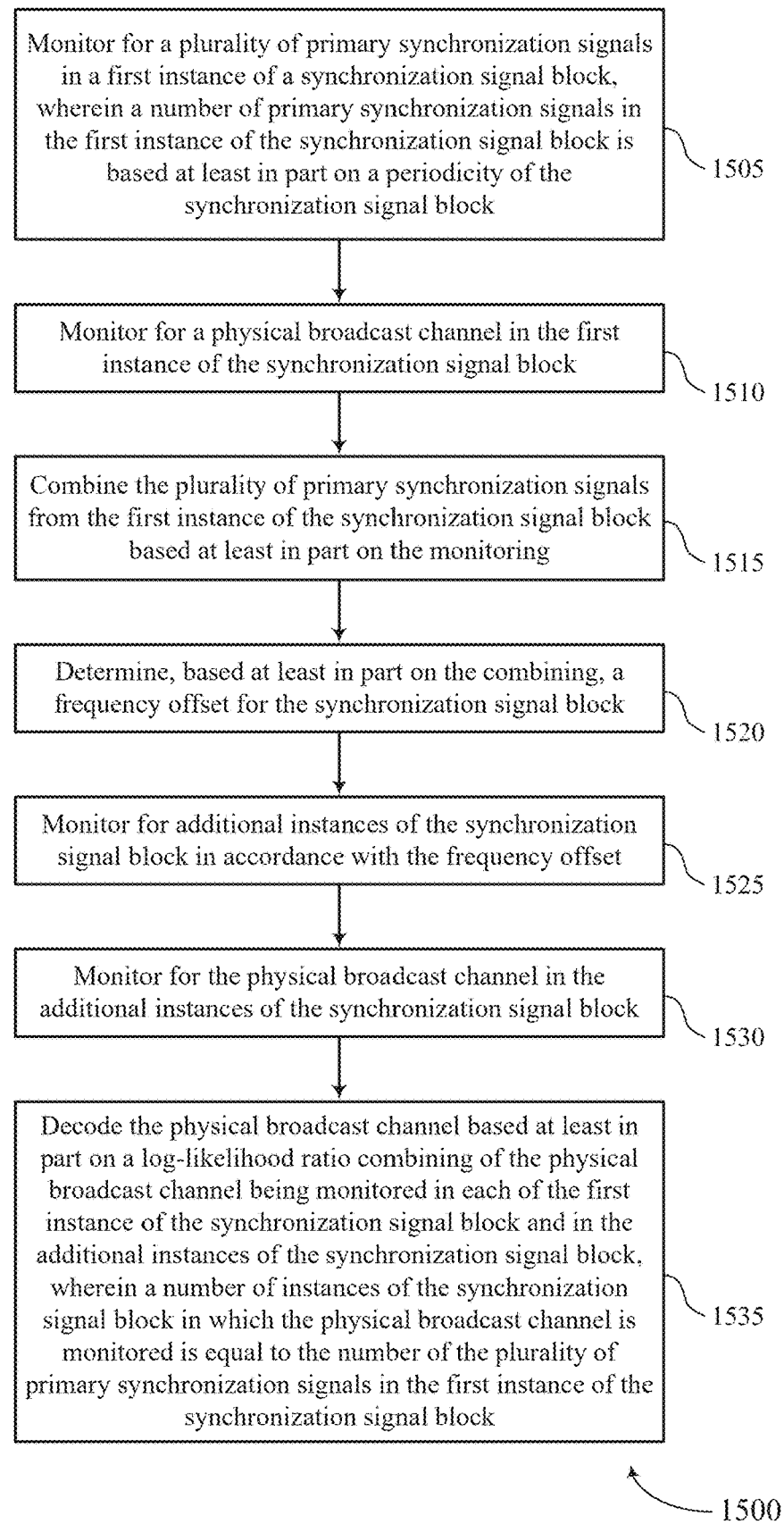

FIG. 15 shows a flowchart illustrating a method 1500 that supports SSB coverage extension for a sub-THz band in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include monitoring for a set of multiple PSSs in a first instance of an SSB, where a number of PSSs in the first instance of the SSB is based on a periodicity of the SSB. The operations of 1505 may be performed in accordance with examples as disclosed herein. In some examples, aspects of the operations of 1505 may be performed by an SSB monitoring component 725 as described with reference to FIG. 7.

At 1510, the method may include monitoring for a PBCH in the first instance of the SSB. The operations of 1510 may be performed in accordance with examples as disclosed herein. In some examples, aspects of the operations of 1510 may be performed by a PBCH monitoring component 755 as described with reference to FIG. 7.

At 1515, the method may include combining the set of multiple PSSs from the first instance of the SSB based on the monitoring. The operations of 1515 may be performed in accordance with examples as disclosed herein. In some examples, aspects of the operations of 1515 may be performed by a PSS combining component 730 as described with reference to FIG. 7.

At 1520, the method may include determining, based on the combining, a frequency offset for the SSB. The operations of 1520 may be performed in accordance with examples as disclosed herein. In some examples, aspects of the operations of 1520 may be performed by a frequency offset determination component 735 as described with reference to FIG. 7.

At 1525, the method may include monitoring for additional instances of the SSB in accordance with the frequency offset. The operations of 1525 may be performed in accordance with examples as disclosed herein. In some examples, aspects of the operations of 1525 may be performed by a monitoring component 740 as described with reference to FIG. 7.

At 1530, the method may include monitoring for the PBCH in the additional instances of the SSB. The operations of 1530 may be performed in accordance with examples as disclosed herein. In some examples, aspects of the operations of 1530 may be performed by a PBCH monitoring component 755 as described with reference to FIG. 7.

At 1535, the method may include decoding the PBCH based on a LLR combining of the PBCH being monitored in each of the first instance of the SSB and in the additional instances of the SSB, where a number of instances of the SSB in which the PBCH is monitored is equal to the number of the set of multiple PSSs in the first instance of the SSB. The operations of 1535 may be performed in accordance with examples as disclosed herein. In some examples, aspects of the operations of 1535 may be performed by a PBCH decoding component 760 as described with reference to FIG. 7.

Figure 16:
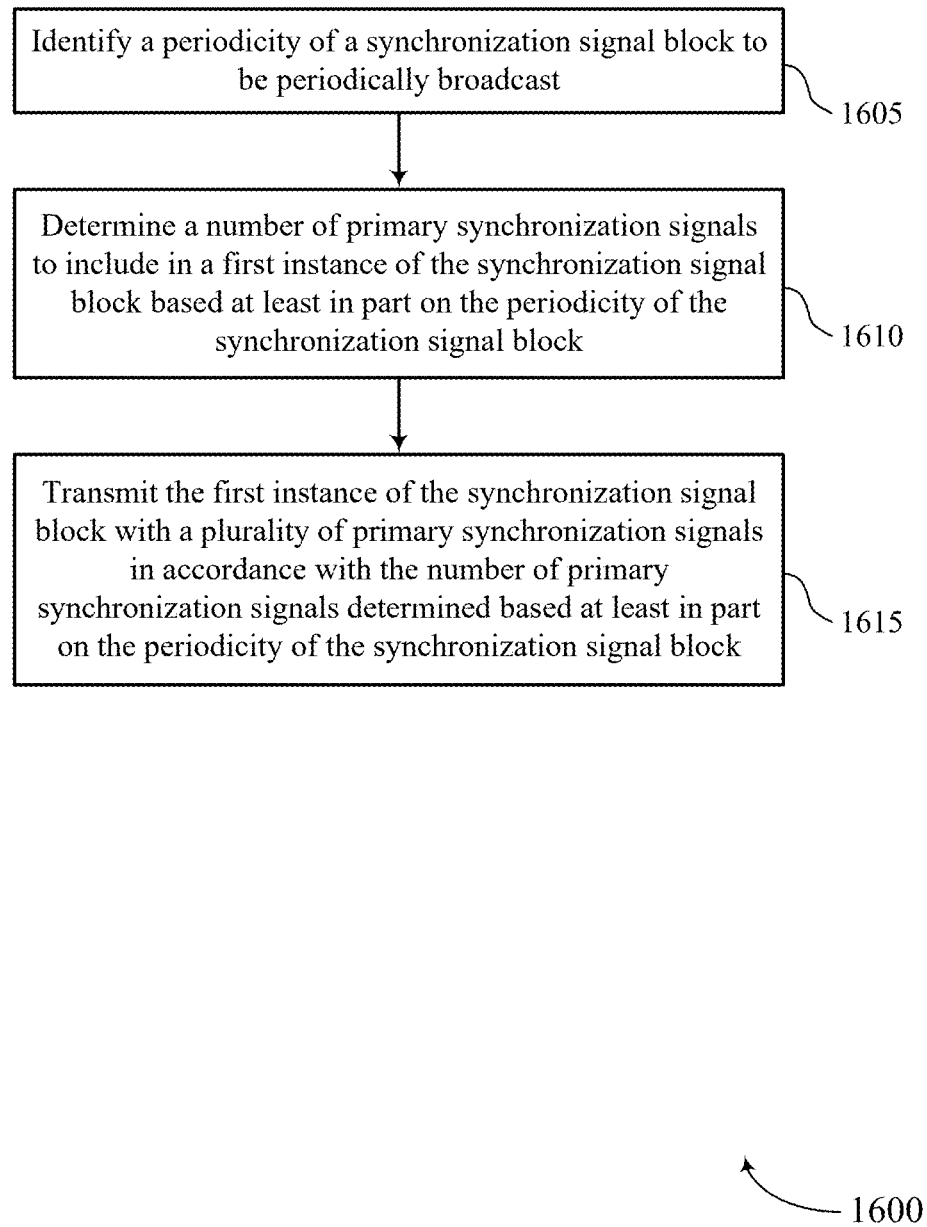

FIG. 16 shows a flowchart illustrating a method 1600 that supports SSB coverage extension for a sub-THz band in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include identifying a periodicity of an SSB to be periodically broadcast. The operations of 1605 may be performed in accordance with examples as disclosed herein. In some examples, aspects of the operations of 1605 may be performed by a periodicity identification component 1125 as described with reference to FIG. 11.

At 1610, the method may include determining a number of PSSs to include in a first instance of the SSB based on the periodicity of the SSB. The operations of 1610 may be performed in accordance with examples as disclosed herein. In some examples, aspects of the operations of 1610 may be performed by a PSS determination component 1130 as described with reference to FIG. 11.

At 1615, the method may include transmitting the first instance of the SSB with a set of multiple PSSs in accordance with the number of PSSs determined based on the periodicity of the SSB. The operations of 1615 may be performed in accordance with examples as disclosed herein.

In some examples, aspects of the operations of 1615 may be performed by an SSB transmission component 1135 as described with reference to FIG. 11.

Figure 17:
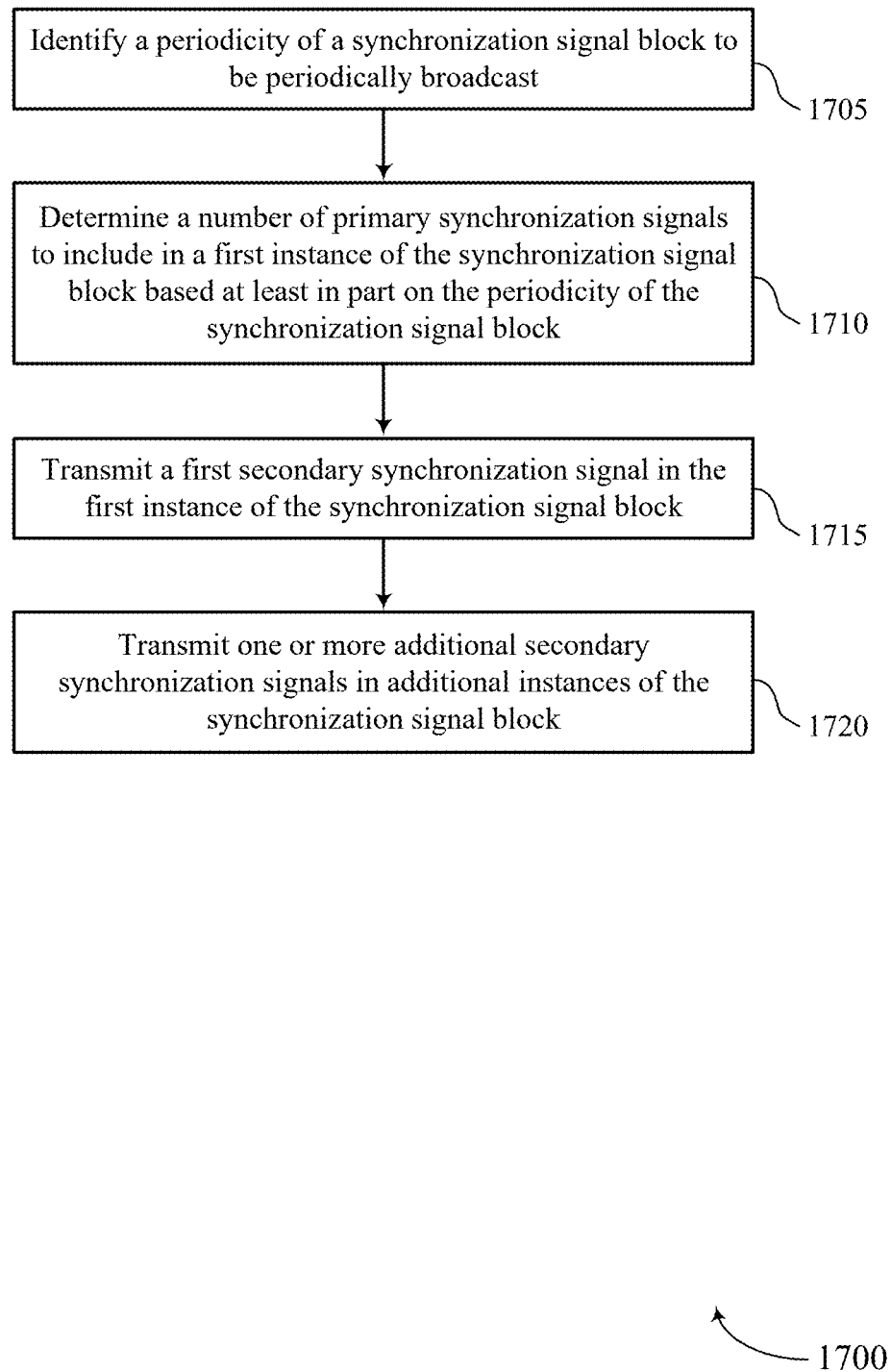

FIG. 17 shows a flowchart illustrating a method 1700 that supports SSB coverage extension for a sub-THz band in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include identifying a periodicity of an SSB to be periodically broadcast. The operations of 1705 may be performed in accordance with examples as disclosed herein. In some examples, aspects of the operations of 1705 may be performed by a periodicity identification component 1125 as described with reference to FIG. 11.

At 1710, the method may include determining a number of PSSs to include in a first instance of the SSB based on the periodicity of the SSB. The operations of 1710 may be performed in accordance with examples as disclosed herein. In some examples, aspects of the operations of 1710 may be performed by a PSS determination component 1130 as described with reference to FIG. 11.

At 1715, the method may include transmitting a first SSS in the first instance of the SSB. The operations of 1715 may be performed in accordance with examples as disclosed herein. In some examples, aspects of the operations of 1715 may be performed by a PSS transmission component 1140 as described with reference to FIG. 11.

At 1720, the method may include transmitting one or more additional SSSs in additional instances of the SSB. The operations of 1720 may be performed in accordance with examples as disclosed herein. In some examples, aspects of the operations of 1720 may be performed by a PSS transmission component 1140 as described with reference to FIG. 11.

Figure 18:
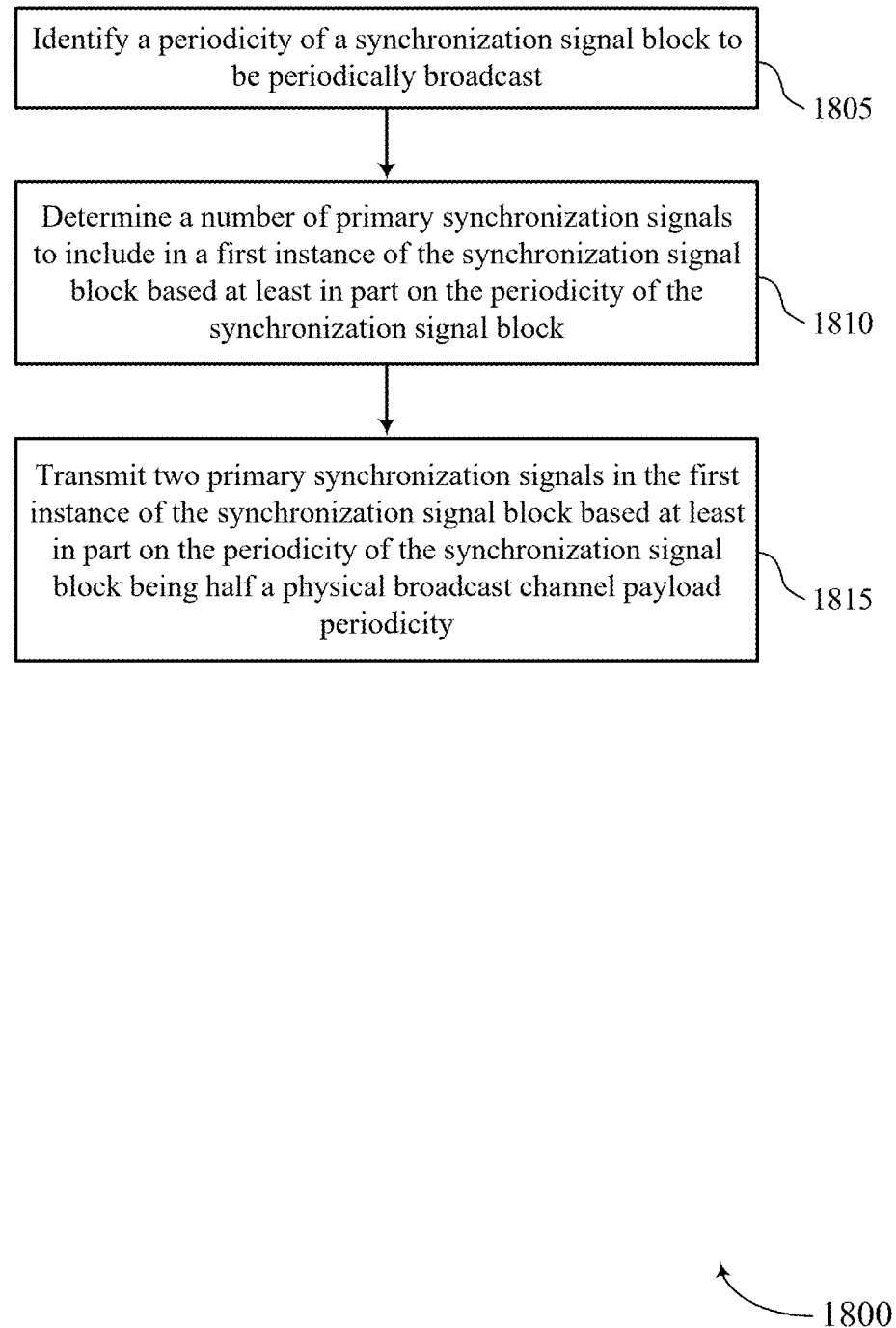

FIG. 18 shows a flowchart illustrating a method 1800 that supports SSB coverage extension for a sub-THz band in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include identifying a periodicity of an SSB to be periodically broadcast. The operations of 1805 may be performed in accordance with examples as disclosed herein. In some examples, aspects of the operations of 1805 may be performed by a periodicity identification component 1125 as described with reference to FIG. 11.

At 1810, the method may include determining a number of PSSs to include in a first instance of the SSB based on the periodicity of the SSB. The operations of 1810 may be performed in accordance with examples as disclosed herein.

In some examples, aspects of the operations of 1810 may be performed by a PSS determination component 1130 as described with reference to FIG. 11.

At 1815, the method may include transmitting two PSSs in the first instance of the SSB based on the periodicity of the SSB being half a PBCH payload periodicity. The operations of 1815 may be performed in accordance with examples as disclosed herein. In some examples, aspects of the operations of 1815 may be performed by a PBCH component 1150 as described with reference to FIG. 11.

The following provides an overview of aspects of the present disclosure:

Aspect 1: A method for wireless communication at a UE, comprising: monitoring for a plurality of PSSs in a first instance of an SSB, wherein a number of PSSs in the first instance of the SSB is based at least in part on a periodicity of the SSB: combining the plurality of PSSs from the first instance of the SSB based at least in part on the monitoring: determining, based at least in part on the combining, a frequency offset for the SSB; and monitoring for additional instances of the SSB in accordance with the frequency offset.

Aspect 2: The method of aspect 1, further comprising: monitoring for a first SSS in the first instance of the SSB: monitoring for one or more additional SSSs in the additional instances of the SSB; and combining the first SSS and the one or more additional SSSs, wherein a number of SSSs combined is equal to the number of the plurality of PSSs in the first instance of the SSB.

Aspect 3: The method of any of aspects 1 through 2, further comprising: monitoring for a PBCH in the first instance of the SSB: monitoring for the PBCH in the additional instances of the SSB; and decoding the PBCH based at least in part on an LLR combining of the PBCH being monitored in each of the first instance of the SSB and in the additional instances of the SSB, wherein a number of instances of the SSB in which the PBCH is monitored is equal to the number of the plurality of PSSs in the first instance of the SSB.

Aspect 4: The method of any of aspects 1 through 3, wherein determining the frequency offset for the SSB comprises: determining one or more frequency offset hypotheses based at least in part on the combining of the plurality of PSSs from the first instance of the SSB; and determining the frequency offset through a frequency offset refinement procedure based on a single instance of the one or more frequency offset hypotheses.

Aspect 5: The method of any of aspects 1 through 4, wherein monitoring for the plurality of PSSs in the first instance of the SSB comprises: monitoring for two or more PSSs that are in adjacent symbols of the first instance of the SSB.

Aspect 6: The method of any of aspects 1 through 5, wherein monitoring for the plurality of PSSs in the first instance of the SSB comprises: monitoring for two or more PSSs that are in non-adjacent symbols of the first instance of the SSB.

Aspect 7: The method of any of aspects 1 through 6, wherein the number of the plurality of PSSs in the first instance of the SSB is further based at least in part on a target SNR for acquisition of the SSB.

Aspect 8: The method of any of aspects 1 through 7, wherein monitoring for the plurality of PSSs in the first instance of the SSB comprises: monitoring for two PSSs in the first instance of the SSB based at least in part on the periodicity of the SSB being half a PBCH payload periodicity.

Aspect 9: The method of any of aspects 1 through 8, wherein monitoring for the plurality of PSSs in the first instance of the SSB comprises: monitoring for four PSSs in the first instance of the SSB based at least in part on the periodicity of the SSB being a quarter or less of a PBCH payload periodicity.

Aspect 10: The method of any of aspects 1 through 9, wherein monitoring for the plurality of PSSs in the first instance of the SSB comprises: monitoring for eight PSSs in the first instance of the SSB based at least in part on the periodicity of the SSB being an eighth or less of a PBCH payload periodicity, wherein the first instance of the SSB occupies a portion of a single slot, the portion being more than a half-slot.

Aspect 11: The method of any of aspects 1 through 10, wherein the number of PSSs in the first instance of the SSB is further based at least in part on the periodicity of the SSB with respect to a PBCH payload periodicity.

Aspect 12: The method of aspect 11, wherein the PBCH payload periodicity is 80 ms.

Aspect 13: The method of any of aspects 11 through 12, wherein the PBCH payload periodicity is greater than 80 ms.

Aspect 14: The method of any of aspects 1 through 13, further comprising: determining the periodicity of the SSB based at least in part on the number of the plurality of PSSs in the first instance of the SSB.

Aspect 15: The method of any of aspects 1 through 14, wherein monitoring for the additional instances of the SSB comprises: monitoring for the additional instances of the SSB in accordance with the frequency offset and on a same beam as the monitoring for the plurality of PSSs in the first instance of the SSB.

Aspect 16: The method of any of aspects 1 through 15, wherein monitoring for the plurality of PSSs comprises: monitoring for the plurality of PSSs in the first instance of the SSB in a sub-THz band.

Aspect 17: The method of any of aspects 1 through 16, further comprising: combining the plurality of PSSs from the first instance of the SSB comprises non-coherent combining.

Aspect 18: The method of any of aspects 1 through 17, further comprising: combining the plurality of PSSs from the first instance of the SSB comprises coherent combining.

Aspect 19: A method for wireless communication at a base station, comprising: identifying a periodicity of an SSB to be periodically broadcast: determining a number of PSSs to include in a first instance of the SSB based at least in part on the periodicity of the SSB; and transmitting the first instance of the SSB with a plurality of PSSs in accordance with the number of PSSs determined based at least in part on the periodicity of the SSB.

Aspect 20: The method of aspect 19, further comprising: transmitting a first SSS in the first instance of the SSB; and transmitting one or more additional SSSs in additional instances of the SSB.

Aspect 21: The method of any of aspects 19 through 20, further comprising: transmitting a PBCH in the first instance of the SSB; and transmitting the PBCH in additional instances of the SSB.

Aspect 22: The method of any of aspects 19 through 21, wherein transmitting the first instance of the SSB with the plurality of PSSs comprises: transmitting two or more PSSs that are in adjacent symbols of the first instance of the SSB.

Aspect 23: The method of any of aspects 19 through 22, wherein transmitting the first instance of the SSB with the plurality of PSSs comprises: transmitting two or more PSSs that are in non-adjacent symbols of the first instance of the SSB.

Aspect 24: The method of any of aspects 19 through 23, wherein the number of the plurality of PSSs in the first instance of the SSB is further based at least in part on a target SNR for acquisition of the SSB.

Aspect 25: The method of any of aspects 19 through 24, wherein transmitting the first instance of the SSB with the plurality of PSSs comprises: transmitting two PSSs in the first instance of the SSB based at least in part on the periodicity of the SSB being half a PBCH payload periodicity.

Aspect 26: The method of any of aspects 19 through 25, wherein transmitting the first instance of the SSB with the plurality of PSSs comprises: transmitting four PSSs in the first instance of the SSB based at least in part on the periodicity of the SSB being a quarter or less of a PBCH payload periodicity.

Aspect 27: The method of any of aspects 19 through 26, wherein transmitting the first instance of the SSB with the plurality of PSSs comprises: transmitting eight PSSs in the first instance of the SSB based at least in part on the periodicity of the SSB being an eighth or less of a PBCH payload periodicity, wherein the first instance of the SSB occupies a portion of a single slot, the portion being more than a half-slot.

Aspect 28: The method of any of aspects 19 through 27, wherein the number of PSSs in the first instance of the SSB is further based at least in part on the periodicity of the SSB with respect to a PBCH payload periodicity.

Aspect 29: The method of aspect 28, wherein the PBCH payload periodicity is 80 ms.

Aspect 30: The method of any of aspects 28 through 29, wherein the PBCH payload periodicity is greater than 80 ms.

Aspect 31: An apparatus for wireless communication at a UE, comprising a processor: memory coupled with the processor; and instructions stored in the memory and executable by the processor to cause the apparatus to perform a method of any of aspects 1 through 18.

Aspect 32: An apparatus for wireless communication at a UE, comprising at least one means for performing a method of any of aspects 1 through 18.

Aspect 33: A non-transitory computer-readable medium storing code for wireless communication at a UE, the code comprising instructions executable by a processor to perform a method of any of aspects 1 through 18.

Aspect 34: An apparatus for wireless communication at a base station, comprising a processor; memory coupled with the processor; and instructions stored in the memory and executable by the processor to cause the apparatus to perform a method of any of aspects 19 through 30.

Aspect 35: An apparatus for wireless communication at a base station, comprising at least one means for performing a method of any of aspects 19 through 30.

Aspect 36: A non-transitory computer-readable medium storing code for wireless communication at a base station, the code comprising instructions executable by a processor to perform a method of any of aspects 19 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

monitoring for a plurality of primary synchronization signals in a first instance of a synchronization signal block, wherein a number of primary synchronization signals in the first instance of the synchronization signal block is based at least in part on a periodicity of the synchronization signal block;

combining the plurality of primary synchronization signals from the first instance of the synchronization signal block based at least in part on the monitoring;

determining, based at least in part on the combining, a frequency offset for the synchronization signal block; and monitoring for additional instances of the synchronization signal block in accordance with the frequency offset.

2. The method of claim 1, further comprising:
monitoring for a first secondary synchronization signal in the first instance of the synchronization signal block;
monitoring for one or more additional secondary synchronization signals in the additional instances of the synchronization signal block; and
combining the first secondary synchronization signal and the one or more additional secondary synchronization signals, wherein a number of secondary synchronization signals combined is equal to the number of the plurality of primary synchronization signals in the first instance of the synchronization signal block.

3. The method of claim 1, further comprising:
monitoring for a physical broadcast channel in the first instance of the synchronization signal block;
monitoring for the physical broadcast channel in the additional instances of the synchronization signal block; and
decoding the physical broadcast channel based at least in part on a log-likelihood ratio combining of the physical broadcast channel being monitored in each of the first instance of the synchronization signal block and in the additional instances of the synchronization signal block, wherein a number of instances of the synchronization signal block in which the physical broadcast channel is monitored is equal to the number of the plurality of primary synchronization signals in the first instance of the synchronization signal block.

4. The method of claim 1, wherein determining the frequency offset for the synchronization signal block comprises:
determining one or more frequency offset hypotheses based at least in part on the combining of the plurality of primary synchronization signals from the first instance of the synchronization signal block; and
determining the frequency offset through a frequency offset refinement procedure based on a single instance of the one or more frequency offset hypotheses.

5. The method of claim 1, wherein monitoring for the plurality of primary synchronization signals in the first instance of the synchronization signal block comprises:
monitoring for two or more primary synchronization signals that are in adjacent symbols of the first instance of the synchronization signal block.

6. The method of claim 1, wherein monitoring for the plurality of primary synchronization signals in the first instance of the synchronization signal block comprises:
monitoring for two or more primary synchronization signals that are in non-adjacent symbols of the first instance of the synchronization signal block.

7. The method of claim 1, wherein the number of the plurality of primary synchronization signals in the first instance of the synchronization signal block is further based at least in part on a target signal-to-noise ratio for acquisition of the synchronization signal block.

8. The method of claim 1, wherein monitoring for the plurality of primary synchronization signals in the first instance of the synchronization signal block comprises:
monitoring for two primary synchronization signals in the first instance of the synchronization signal block based at least in part on the periodicity of the synchronization signal block being half a physical broadcast channel payload periodicity.

9. The method of claim 1, wherein monitoring for the plurality of primary synchronization signals in the first instance of the synchronization signal block comprises:
monitoring for four primary synchronization signals in the first instance of the synchronization signal block based at least in part on the periodicity of the synchronization signal block being a quarter or less of a physical broadcast channel payload periodicity.

10. The method of claim 1, wherein monitoring for the plurality of primary synchronization signals in the first instance of the synchronization signal block comprises:
monitoring for eight primary synchronization signals in the first instance of the synchronization signal block based at least in part on the periodicity of the synchronization signal block being an eighth or less of a physical broadcast channel payload periodicity, wherein the first instance of the synchronization signal block occupies a portion of a single slot, the portion being more than a half-slot.

11. The method of claim 1, wherein the number of primary synchronization signals in the first instance of the synchronization signal block is further based at least in part on the periodicity of the synchronization signal block with respect to a physical broadcast channel payload periodicity.

12. The method of claim 11, wherein the physical broadcast channel payload periodicity is 80 ms.

13. The method of claim 11, wherein the physical broadcast channel payload periodicity is greater than 80 ms.

14. The method of claim 1, further comprising:
determining the periodicity of the synchronization signal block based at least in part on the number of the plurality of primary synchronization signals in the first instance of the synchronization signal block.

15. The method of claim 1, wherein monitoring for the additional instances of the synchronization signal block comprises:
monitoring for the additional instances of the synchronization signal block in accordance with the frequency offset and on a same beam as the monitoring for the plurality of primary synchronization signals in the first instance of the synchronization signal block.

16. The method of claim 1, wherein monitoring for the plurality of primary synchronization signals comprises:
monitoring for the plurality of primary synchronization signals in the first instance of the synchronization signal block in a sub-terahertz band.

17. The method of claim 1, further comprising:
combining the plurality of primary synchronization signals from the first instance of the synchronization signal block comprises non-coherent combining.

18. The method of claim 1, further comprising:
combining the plurality of primary synchronization signals from the first instance of the synchronization signal block comprises coherent combining.

19. A method for wireless communication at a base station, comprising:

identifying a periodicity of a synchronization signal block to be periodically broadcast;

determining a number of primary synchronization signals to include in a first instance of the synchronization signal block based at least in part on the periodicity of the synchronization signal block; and transmitting the first instance of the synchronization signal block with a plurality of primary synchronization signals in accordance with the number of primary synchronization signals determined based at least in part on the periodicity of the synchronization signal block.

20. The method of claim 19, further comprising:

transmitting a first secondary synchronization signal in the first instance of the synchronization signal block; and transmitting one or more additional secondary synchronization signals in additional instances of the synchronization signal block.

21. The method of claim 19, further comprising:

transmitting a physical broadcast channel in the first instance of the synchronization signal block; and transmitting the physical broadcast channel in additional instances of the synchronization signal block.

22. The method of claim 19, wherein transmitting the first instance of the synchronization signal block with the plurality of primary synchronization signals comprises:

transmitting two or more primary synchronization signals that are in adjacent symbols of the first instance of the synchronization signal block.

23. The method of claim 19, wherein transmitting the first instance of the synchronization signal block with the plurality of primary synchronization signals comprises:

transmitting two or more primary synchronization signals that are in non-adjacent symbols of the first instance of the synchronization signal block.

24. The method of claim 19, wherein the number of the plurality of primary synchronization signals in the first instance of the synchronization signal block is further based at least in part on a target signal-to-noise ratio for acquisition of the synchronization signal block.

25. The method of claim 19, wherein transmitting the first instance of the synchronization signal block with the plurality of primary synchronization signals comprises:

transmitting two primary synchronization signals in the first instance of the synchronization signal block based at least in part on the periodicity of the synchronization signal block being half a physical broadcast channel payload periodicity.

26. The method of claim 19, wherein transmitting the first instance of the synchronization signal block with the plurality of primary synchronization signals comprises:

transmitting four primary synchronization signals in the first instance of the synchronization signal block based at least in part on the periodicity of the synchronization signal block being a quarter or less of a physical broadcast channel payload periodicity.

27. The method of claim 19, wherein transmitting the first instance of the synchronization signal block with the plurality of primary synchronization signals comprises:

transmitting eight primary synchronization signals in the first instance of the synchronization signal block based at least in part on the periodicity of the synchronization signal block being an eighth or less of a physical broadcast channel payload periodicity, wherein the first instance of the synchronization signal block occupies a portion of a single slot, the portion being more than a half-slot.

28. The method of claim 19, wherein the number of primary synchronization signals in the first instance of the synchronization signal block is further based at least in part on the periodicity of the synchronization signal block with respect to a physical broadcast channel payload periodicity.

29. An apparatus for wireless communication at a user equipment (UE), comprising:

a processor;

memory coupled with the processor; and instructions stored in the memory and executable by the processor to cause the apparatus to:

monitor for a plurality of primary synchronization signals in a first instance of a synchronization signal block, wherein a number of primary synchronization signals in the first instance of the synchronization signal block is based at least in part on a periodicity of the synchronization signal block;

combine the plurality of primary synchronization signals from the first instance of the synchronization signal block based at least in part on the monitoring;

determine, based at least in part on the combining, a frequency offset for the synchronization signal block; and monitor for additional instances of the synchronization signal block in accordance with the frequency offset.

30. An apparatus for wireless communication at a base station, comprising:

a processor;

memory coupled with the processor; and instructions stored in the memory and executable by the processor to cause the apparatus to:

identify a periodicity of a synchronization signal block to be periodically broadcast;

determine a number of primary synchronization signals to include in a first instance of the synchronization signal block based at least in part on the periodicity of the synchronization signal block; and transmit the first instance of the synchronization signal block with a plurality of primary synchronization signals in accordance with the number of primary synchronization signals determined based at least in part on the periodicity of the synchronization signal block.

* * * * *